United States Patent
Forutanpour et al.

(10) Patent No.: US 10,048,086 B2
(45) Date of Patent: Aug. 14, 2018

(54) SYSTEMS AND METHODS FOR TRIP PLANNING

(71) Applicant: QUALCOMM Incorporated, San Diego, CA (US)

(72) Inventors: Bijan Forutanpour, San Diego, CA (US); Jonathan Kies, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/457,300

(22) Filed: Mar. 13, 2017

(65) Prior Publication Data

US 2018/0136005 A1     May 17, 2018

Related U.S. Application Data

(60) Provisional application No. 62/421,729, filed on Nov. 14, 2016.

(51) Int. Cl.
*G01C 21/36* (2006.01)
*G01C 21/34* (2006.01)

(52) U.S. Cl.
CPC ....... *G01C 21/3679* (2013.01); *G01C 21/343* (2013.01); *G01C 21/3611* (2013.01); *G06T 2207/30196* (2013.01)

(58) Field of Classification Search
CPC ............ G01C 21/3679; G01C 21/3611; G01C 21/343; G06T 2207/30196
See application file for complete search history.

(56) References Cited

U.S. PATENT DOCUMENTS

| 5,504,482 A | 4/1996 | Schreder |
| 7,487,017 B1 | 2/2009 | Bell et al. |
| 7,512,487 B1 | 3/2009 | Golding et al. |
| 8,392,116 B2 | 3/2013 | Lehmann et al. |

(Continued)

FOREIGN PATENT DOCUMENTS

| EP | 3040682 A1 | 7/2016 |
| GB | 2452504 A | 3/2009 |

(Continued)

OTHER PUBLICATIONS

International Search Report and Written Opinion—PCT/US2017/053316—ISA/EPO—dated Nov. 9, 2017.

*Primary Examiner* — Michael J Zanelli
(74) *Attorney, Agent, or Firm* — Austin Rapp

(57) ABSTRACT

A method performed by an electronic device is described. The method includes obtaining one or more trip objectives. The method also includes obtaining one or more evaluation bases. The method further includes identifying an association between at least one site and the one or more trip objectives. The method additionally includes obtaining sensor data from the at least one site. The sensor data includes at least image data. The method also includes performing analysis on the image data to determine dynamic destination information corresponding to the at least one site. The method further includes performing trip planning based on the dynamic destination information, the one or more trip objectives, and the one or more evaluation bases. The method additionally includes providing one or more suggested routes based on the trip planning.

30 Claims, 10 Drawing Sheets

(56) References Cited

U.S. PATENT DOCUMENTS

| | | |
|---|---|---|
| 8,972,175 B2 | 3/2015 | Annapureddy et al. |
| 2006/0178811 A1 | 8/2006 | Liu et al. |
| 2008/0201227 A1 | 8/2008 | Bakewell et al. |
| 2009/0132673 A1 | 5/2009 | Sprigg |
| 2012/0147169 A1 | 6/2012 | Harper et al. |
| 2013/0013191 A1* | 1/2013 | Dillahunt ........... G01C 21/3415 701/423 |
| 2014/0058768 A1 | 2/2014 | Moxley et al. |
| 2014/0075528 A1* | 3/2014 | Matsuoka ................ G06F 21/32 726/7 |
| 2014/0108066 A1 | 4/2014 | Lam et al. |
| 2016/0109243 A1 | 4/2016 | Tseng et al. |

FOREIGN PATENT DOCUMENTS

| | | | |
|---|---|---|---|
| GB | 2489556 A | | 10/2012 |
| JP | 2010-176225 | * | 8/2010 |

* cited by examiner

SYSTEMS AND METHODS FOR TRIP PLANNING

RELATED APPLICATION

This application is related to and claims priority to U.S. Provisional Patent Application Ser. No. 62/421,729, filed Nov. 14, 2016, for "SYSTEMS AND METHODS FOR TRIP PLANNING."

FIELD OF DISCLOSURE

The present disclosure relates generally to electronic devices. More specifically, the present disclosure relates to systems and methods for trip planning.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions, perform richer functions, and/or that perform functions faster, more efficiently, and/or more reliably are often sought after.

Advances in technology have resulted in smaller and more powerful electronic devices. For example, there currently exist a variety of electronic devices such as portable wireless telephones (e.g., smartphones), personal digital assistants (PDAs), laptop computers, tablet computers and paging devices that are each small, lightweight and can be easily carried by users.

Users often value time, money, and experience when engaging in various activities. However, users may be limited in their ability to access and/or assess information to improve their experience, expenditure of time, and/or expenditure of money. As can be observed from this discussion, improving user experience, improving expenditure of time, and/or improving expenditure of money may be beneficial.

SUMMARY

A method performed by an electronic device is described. The method includes obtaining one or more trip objectives. The method also includes obtaining one or more evaluation bases. The method further includes identifying an association between at least one site and the one or more trip objectives. The method additionally includes obtaining sensor data from the at least one site. The sensor data includes at least image data. The method also includes performing analysis on the image data to determine dynamic destination information corresponding to the at least one site. The method further includes performing trip planning based on the dynamic destination information, the one or more trip objectives, and the one or more evaluation bases. The method additionally includes providing one or more suggested routes based on the trip planning.

The method may include determining whether one of the one or more suggested routes is accepted. In a case that none of the one or more suggested routes is accepted, the method may include obtaining non-service information for one or more non-service sites and performing trip planning based on comparing the non-service information with the dynamic destination information. In a case that none of the one or more suggested routes is accepted, the method may include providing one or more alternate routes based on the comparison.

The method may include determining whether one of the one or more suggested routes is accepted. In a case that none of the one or more suggested routes is accepted, the method may include providing one or more alternate routes and performing trip planning training based on an alternate route selection.

The dynamic destination information may be updated on an order of minutes or seconds. The dynamic destination information may include a time aspect of an activity at the at least one site, a population aspect at the at least one site, a product aspect at the at least one site, a service aspect at the at least one site, and/or a site feature aspect. The time aspect may include parking time, wait time, transaction time, and/or service time. The population aspect may include a number of people, demographics of people, clothing of people, emotion of people, state of people, and/or activity of people. The product aspect at the at least one site may include product availability, product accessibility, product deals, and/or product price. The service aspect may include service availability, service accessibility, service deals, and/or service price. The site feature aspect may include type of furniture, location of furniture, amount of furniture, furniture occupancy, number of bathrooms, bathroom availability, site cleanliness, and/or site lighting.

The method may include determining a selection or weighting of a plurality of information types for trip planning. The plurality of information types may include the dynamic destination information and one or more other information types. The one or more other information types may be based on at least one image taken from a vehicle of an external scene.

The method may include ranking a set of potential trips based on a degree to which each of the potential trips satisfies the one or more trip objectives in accordance with the one or more evaluation bases. The method may include obtaining analysis on one or more images of one or more users from a vehicle interior to determine user model data. Performing the trip planning may be further based on the user model data.

An electronic device is also described. The electronic device includes a processor. The electronic device also includes a memory in electronic communication with the processor. The electronic device further includes instructions stored in the memory. The instructions are executable to obtain one or more trip objectives. The instructions are also executable to obtain one or more evaluation bases. The instructions are further executable to identify an association between at least one site and the one or more trip objectives. The instructions are additionally executable to obtain sensor data from the at least one site. The sensor data includes at least image data. The instructions are also executable to perform analysis on the image data to determine dynamic destination information corresponding to the at least one site. The instructions are further executable to perform trip planning based on the dynamic destination information, the one or more trip objectives, and the one or more evaluation bases. The instructions are additionally executable to provide one or more suggested routes based on the trip planning.

A non-transitory tangible computer-readable medium storing computer-executable code is also described. The computer-readable medium includes code for causing an electronic device to obtain one or more trip objectives. The computer-readable medium also includes code for causing the electronic device to obtain one or more evaluation bases. The computer-readable medium further includes code for causing the electronic device to identify an association between at least one site and the one or more trip objectives. The computer-readable medium additionally includes code for causing the electronic device to obtain sensor data from the at least one site. The sensor data includes at least image data. The computer-readable medium also includes code for causing the electronic device to perform analysis on the image data to determine dynamic destination information corresponding to the at least one site. The computer-readable medium further includes code for causing the electronic device to perform trip planning based on the dynamic destination information, the one or more trip objectives, and the one or more evaluation bases. The computer-readable medium additionally includes code for causing the electronic device to provide one or more suggested routes based on the trip planning.

An apparatus is also described. The apparatus includes means for obtaining one or more trip objectives. The apparatus also includes means for obtaining one or more evaluation bases. The apparatus further includes means for identifying an association between at least one site and the one or more trip objectives. The apparatus additionally includes means for obtaining sensor data from the at least one site. The sensor data includes at least image data. The apparatus also includes means for performing analysis on the image data to determine dynamic destination information corresponding to the at least one site. The apparatus further includes means for performing trip planning based on the dynamic destination information, the one or more trip objectives, and the one or more evaluation bases. The apparatus additionally includes means for providing one or more suggested routes based on the trip planning.

DETAILED DESCRIPTION

Figure 1:
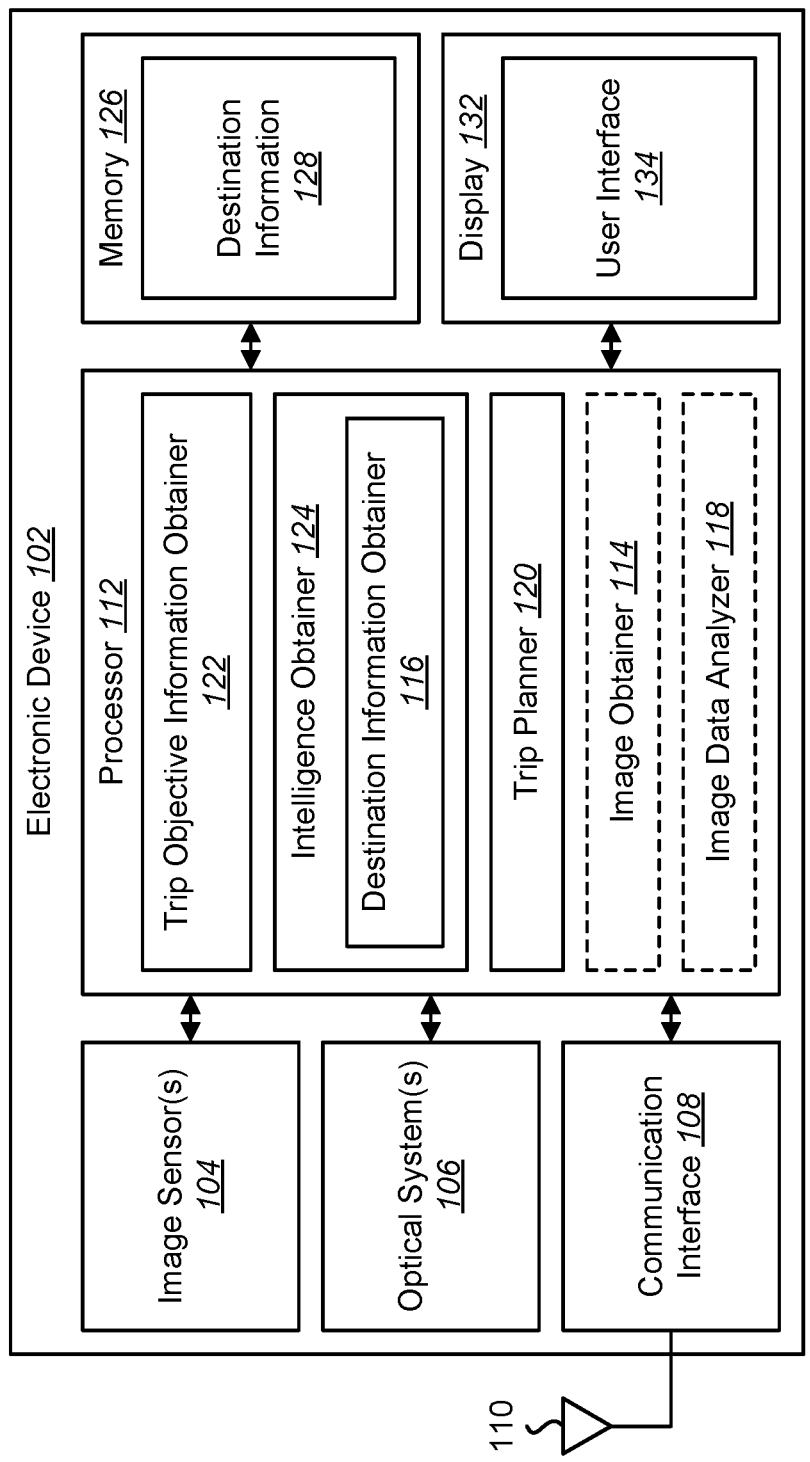
FIG. 1 is a block diagram illustrating one example of an electronic device in which systems and methods for trip planning may be implemented.

The systems and methods disclosed herein may relate to trip planning. For instance, some configurations of the systems and methods disclosed herein may provide trip planning based on local destination analysis. In particular, some example use cases of the systems and methods disclosed herein may include driving to work in the shortest amount of time, running errands in a time efficient way, and decision making on whether to run errands. One objective of some configurations may be to optimize routing decisions based on local destination information (e.g., the length of a line within a grocery store, detected emotions of patrons of a bar, etc.). The systems and methods disclosed herein may be useful and/or beneficial, particularly as people spend more and more time in cars in transit.

The systems and methods disclosed herein may be implemented in a variety of contexts, which may include mobile platforms and/or automotive platforms. The systems and methods disclosed herein may be implemented in applications for entertainment, productivity, and/or navigation, etc.

Driving a car (e.g., a user-driven car or a driverless car) may require decisions to be made on the route taken, given the allotted time. Some configurations of the systems and methods disclosed herein may help in this process, increasing (e.g., maximizing) the efficient usage of resources such as time and money. Additionally or alternatively, some configurations of the systems and methods disclosed herein may allow for other goals and/or tasks to be accomplished concurrently (e.g., simultaneously).

Some navigation systems do not provide local information for specific destinations or destination types. For example, while traffic information, weather information, road information, etc., may be available for suggested routing and trip planning, services may be unable to query conditions within a destination for consideration by a user.

In one scenario, a user would like to compare time costs for visiting different grocery stores on the way home. Part of these costs may be attributed to transit time on road. Additional aspects of cost for different options may include parking availability, length of service lines, availability of products of interest, etc.

In another scenario, a user would like suggestions on potential dining options. In addition to time costs discussed above and similar considerations (e.g., wait time for table, average length of stay by patrons, etc.), the user may be interested in overall emotional state of patrons, classification of patrons (e.g., female versus male distribution, style of dress, number of people, etc.), type of music, volume of music, lighting conditions, etc.

Given the trip type (e.g., objective(s), task(s), purpose(s), etc.) and one or more evaluation bases (e.g., optimization goals), some configurations of the systems and methods disclosed herein may evaluate and analyze potential destinations by use of distributed, automated information sources. Such sources may include information gathered using computer vision analysis of Internet protocol (IP) cameras (e.g., face, object, scene, gender, emotion, motion, clothing analysis, etc.) as well as sensor data (e.g., beacons, global positioning system (GPS), heat sensor, microphone, etc.). Based on the analysis of destination and/or of the route itself, the systems and methods disclosed herein may suggest an optimal trip (e.g., route). Other information sources (e.g., social media, purchase activity, and/or a digital calendar, etc.) may be used to evaluate and analyze potential destinations in some configurations.

Some configurations of the systems and methods disclosed herein may utilize computer vision as part of a smart cities system. For example, information may be fed back to a system that helps decision making and route planning.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for trip planning may be implemented. Examples of the electronic device 102 include cellular phones, smart phones, computers (e.g., desktop computers, laptop computers, etc.), tablet devices, media players, televisions, automobiles, cameras, video camcorders, digital cameras, personal cameras, action cameras, wearable device cameras (e.g., cameras integrated with watches, head-mounted displays, etc.), wearable devices (e.g., smart watches), surveillance cameras, mounted cameras, connected cameras, robots, aircraft, drones, drone cameras, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry) or a combination of hardware and software (e.g., a processor with instructions).

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In another example, the electronic device 102 may provide a voice interface (instead of or in addition to a touch screen interface, for instance). For example, the electronic device 102 may include, may be coupled to, and/or may be in communication with a microphone that receives speech signals. The voice interface may recognize speech (e.g., words) to provide input (e.g., commands, instructions, etc.) to the electronic device 102 (e.g., to the processor 112, intelligence obtainer 124, trip planner 120, etc.). In some configurations, one or more of the images described herein may be presented on the display 132 and/or user interface 134.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

In some configurations, the electronic device 102 (e.g., image obtainer 114) may obtain one or more images (e.g., digital images, image frames, frames, video, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, etc.). In some implementations, the electronic device 102 may include multiple optical system(s) 106 and/or multiple image sensors 104.

Additionally or alternatively, the electronic device 102 may request and/or receive the one or more images from another device (e.g., one or more external image sensors coupled to the electronic device 102, a network server, traffic camera, drop camera, automobile camera, web camera, security camera, remote camera, on-site camera, other electronic devices, mobile devices, user devices, smart phones, etc.). In some configurations, the electronic device 102 may request and/or receive the one or more images via the communication interface 108. For example, the electronic device 102 may or may not include a camera (e.g., an image sensor 104 and/or optical system 106) and may receive images from one or more remote devices (e.g., remote cameras, remote servers, remote electronic devices, remote user devices, etc.).

The memory 126 may store instructions and/or data. The processor 112 may access (e.g., read from and/or write to) the memory 126. Examples of instructions and/or data that may be stored by the memory 126 may include destination information 128 (e.g., real-time dynamic destination information), trip planning information, trip objective information, evaluation basis information, image obtainer 114 instructions, intelligence obtainer 124 instructions, destination information obtainer 116 instructions, image data analyzer 118 instructions, trip planner 120 instructions, trip objective information obtainer 122 instructions, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames and/or one or more still images.

The processor 112 may include and/or implement an intelligence obtainer 124 (e.g., an intelligence gatherer), a destination information obtainer 116, a trip planner 120, a trip objective information obtainer 122, an image obtainer 114, and/or an image data analyzer 118. It should be noted that one or more of the elements illustrated in the electronic device 102 and/or processor 112 may be optional. For example, the image obtainer 114 and/or the image data analyzer 118 may or may not be included and/or implemented. Additionally or alternatively, one or more of the elements illustrated in the processor 112 may be implemented separately from the processor 112 (e.g., in other circuitry, on another processor, on a separate electronic device, etc.).

The processor 112 may include and/or implement a trip objective information obtainer 122. The trip objective information obtainer 122 may obtain trip objective information. For example, the trip objective information obtainer 122 may obtain information regarding one or more trip objectives. Trip objective information may include one or more trip objectives and/or one or more evaluation bases. Examples of trip objectives may include one or more destinations, activities, products, services, etc. For instance, trip objectives may be places (e.g., specific places or a general place category) where a user wants to go, activities the user wants to engage in (e.g., dancing, dining, grocery shopping, work, an event, socializing, etc.), products that the user wants to buy or browse, and/or services that the user wants rendered.

The evaluation basis or bases may be one or more criteria for evaluating one or more destinations (e.g., sites) and/or potential trips. Examples of evaluation bases may include money, time, safety, population (e.g., number of people, demographics, clothing, emotion, state, activity, etc.), product availability, product accessibility, product deals, product price, service availability, service accessibility, service deals, and/or service price, etc. For instance, an evaluation basis may be time, indicating that one or more destinations are to be evaluated based on time, with shorter times receiving priority. In another example, an evaluation basis may be money, indicating that one or more destinations are to be evaluated based on cost in money, with lower money costs receiving priority. Combinations of evaluation bases may be obtained and/or utilized. For example, a lowest money cost within an amount of time may be the evaluation bases. An example of evaluation bases is provided in connection with FIG. 5.

In some configurations, the trip objective information obtainer 122 may obtain the trip objective information from the user interface 134. For example, the user interface 134 may receive trip objective information (e.g., one or more trip objectives and/or one or more evaluation bases) from inputs received from a user. Additionally or alternatively, the trip objective information obtainer 122 may receive trip objective information from a remote device. For example, the communication interface 108 may receive one or more signals from a remote device indicating the trip objective information.

The processor 112 may include and/or implement an intelligence obtainer 124. The intelligence obtainer 124 may obtain (e.g., gather) one or more types of information for trip planning. For example, the intelligence obtainer 124 may obtain vehicle information, environment information, road information, and/or destination information.

Vehicle information may be information about one or more vehicles for a trip. Vehicle information may include information (e.g., status information, vehicle sensor information, etc.) that may be obtained directly from a vehicle. For example, vehicle information may include fuel remaining, engine temperature, engine status, tire information (e.g., tire inflation, tire wear, tire type, etc.), oil status (e.g., oil life remaining), brake wear, vehicle camera image data, speed, revolutions per minute (RPM), occupancy, fluid status (e.g., brake fluid, transmission fluid, windshield wiper fluid, etc.), alarm codes, and/or cargo weight, etc. In some configurations, the vehicle information may be obtained from one or more vehicle sensors (e.g., integrated vehicle sensors). The vehicle information may be transmitted to another device (e.g., a remote device) in some approaches.

The environment information may include environment information corresponding to a vehicle, to routes (e.g., roads), and/or other areas (e.g., potential destinations, etc.). For example, environment information may include visibility (e.g., fog), weather conditions (e.g., sunny, rain, snow, freezing rain, forecasted weather, etc.), etc. In some configurations, the environment information may be obtained from a remote device (e.g., a web-based weather service, a remote server, etc.). Additionally or alternatively, environment information may be obtained from one or more vehicle sensors (e.g., temperature sensor). In some configurations, the vehicle information may be obtained (e.g., received, determined, etc.) based on image data from a vehicle camera (e.g., an external-facing camera integrated into the (interior or exterior of the) vehicle and/or mounted on the vehicle) and/or a camera that captures a scene that the vehicle is in. For example, the electronic device 102 may perform analysis on image data (of an external scene, for instance) from the camera to determine visibility (e.g., fog), weather conditions (e.g., sunny, rain, snow, freezing rain, forecasted weather, etc.), etc.

The path information may include information about one or more paths (e.g., potential routes, roads, paths, sidewalks, bike lanes, bike trails, rails, etc.). Path information may include information regarding travel to one or more destinations. For example, path information may include traffic information, road condition (e.g., potholes, loose gravel, etc.), construction (e.g., closed lanes), carpool lane availability, path distance(s), path travel time, path traffic, and/or path type(s) (e.g., automobile, bus, train, bike, walking, airplane, boat, etc.), etc. In some configurations, the path information may be obtained from a remote device (e.g., a web-based service, a remote server, etc.). Additionally or alternatively, path information may be obtained from one or more vehicle sensors (e.g., traction control, vehicle image sensors, etc.). For example, path information may be obtained (e.g., received, determined, etc.) based on image data from a vehicle camera (e.g., an external-facing camera integrated into the (interior or exterior of the) vehicle and/or mounted on the vehicle) and/or a camera that captures an image of the path (e.g., road). For instance, the electronic device 102 may perform analysis on image data (of a road image, for instance) from the camera to determine the path information.

The processor 112 may include and/or implement a destination information obtainer 116. The destination information obtainer 116 may obtain destination information. For example, the destination information obtainer 116 may obtain real-time dynamic destination information. The dynamic destination information may correspond to one or more sites (e.g., potential destinations). A site may be a location, an area, an establishment, a venue, a facility, a building, a park, etc. The destination information obtainer 116 may obtain dynamic destination information that is specific to one or more sites. Dynamic destination information may include information about a site that is dynamic (e.g., changeable, variable, etc.). For example, dynamic destination information may include destination information that may vary (e.g., may vary periodically or aperiodically, irregularly, unpredictably, with a degree of uncertainty, etc.). In some configurations, real-time dynamic destination information may be updated on an order of minutes, seconds, milliseconds, or less (e.g., not on an order of hours or days). Real-time dynamic destination information may indicate real-time information about a current site status and/or current activity at a site. For example, real-time dynamic destination information may not be a projection of historical trends to estimate expected activity or status at a site. For example, real-time dynamic destination information may indicate a current wait time based on real-time data from a site, not based on historical data. In some configurations, the destination information (e.g., destination information 128) may be stored in the memory 126. In some configurations, "real-time" may mean close in time (e.g., not necessarily contemporaneous). For example, "real-time" and/or close in time may be within one or more time ranges (e.g., within 10 minutes, 5 minutes, 1 minute, 30 seconds (s), 15 s, 10 s, 5 s, 3 s, 1 s, 800 milliseconds (ms), 500 ms, 300 ms, 200 ms, 100 ms, 50 ms, 25 ms, 15 ms, etc.) from actual events, occurrences, and/or states. For instance, "real-time" may include only one or more of times (e.g., delays) to capture data, store data, process data, interpret data, transmit (e.g., format, modulate, encode, amplify, etc.) data, and/or receive (e.g., amplify, demodulate, decode, de-format, etc.) data.

One or more types of information inputs may be utilized to obtain destination information (e.g., dynamic destination information, real-time dynamic destination information, etc.). For example, types of information inputs may include microphones, cameras (e.g., IP cameras), mobile device cameras (e.g., an opt-in service that may share data with the system), wearable device cameras (e.g., cameras integrated with watches or head-mounted displays), drone cameras, and/or beacons. For example, destination information may be based on one or more smart phone images from the destination. In some configurations, real-time dynamic destination information may be based on information from one or more on-site sensors. For example, a site (e.g., area, venue, business, building, etc.) may include one or more on-site sensors such as image sensors, cameras, microphones, pressure sensors, and/or light sensors, etc. In some configurations, one or more fixed on-site sensors may be installed, statically affixed, and/or semi-statically affixed at a site. For example, a fixed on-site sensor (e.g., a mounted camera, installed pressure sensor, installed light sensor, etc.) may be a fixture at a site. Additionally or alternatively, one or more mobile on-site sensors may be utilized. A mobile on-site sensor may be a mobile (e.g., transient, moveable, etc.) sensor at a site. Examples of mobile on-site sensors may include smartphones, wearable cameras, etc.

It should be noted that one or more other information inputs that do not provide real-time dynamic destination information may be utilized in combination with real-time dynamic destination information in some configurations. For example, social media data (e.g., non-real-time postings including text, audio data, and/or image data on a platform at a given location/destination, etc.) may be used in combination with real-time dynamic destination information in some approaches for trip planning.

The dynamic destination information (e.g., real-time dynamic destination information) may be determined by the electronic device 102 and/or by one or more remote devices. For example, the electronic device 102 may perform analysis (e.g., scene analysis, computer vision analysis, classification analysis, etc.) on one or more images to determine the real-time dynamic destination information. Additionally or alternatively, the electronic device 102 may request and/or receive real-time dynamic destination information from one or more remote devices. For example, the destination information obtainer 116 may request and/or receive one or more time aspects, population aspects, product aspects, service aspects, and/or feature aspects (via the communication interface 108, for example). For instance, a web server may report wait times at restaurants, club occupancy, etc.

In some configurations, the dynamic destination information (e.g., real-time dynamic destination information) may include a time aspect of an activity at the site(s), a population aspect at the site(s), a product aspect at the site(s), a service aspect at the site(s), and/or a site feature aspect. Examples of the time aspect may include parking time, wait time, transaction time, and/or service time. Examples of the population aspect may include a number of people (e.g., real-time number of people), density of people, demographics of people, clothing of people, emotion of people, state of people, and/or activity of people. Examples of the product aspect may include product availability, product accessibility, product deals, and/or product price. Examples of the service aspect may include service availability, service accessibility, service deals, and/or service price. Examples of the site feature aspect may include furniture occupancy, type of furniture, location of furniture, amount of furniture, number of bathrooms, bathroom availability, site cleanliness, and/or site lighting.

It should be noted that real-time dynamic destination information may not include historical information (e.g., information older than the real-time dynamic destination information). For example, the real-time dynamic destination information may not include historical trends based on group (e.g., aggregate) population behavior (e.g., how busy a venue may be per hour based on historical data and/or trends). It should be further noted that real-time dynamic destination information may be utilized without historical information in some configurations, or may be used in combination with historical information in some configurations.

In some approaches, the dynamic destination information (e.g., real-time dynamic destination information) may be configurable and/or may be generated in response to a specific request. For example, the dynamic destination information may be determined based on the trip objective information (e.g., one or more evaluation bases and/or one or more trip objectives). For instance, different dynamic destination information (e.g., real-time dynamic destination information) may be requested, received, and/or determined based on a specific user request. In one example, a user may request a gender ratio for a particular venue (and/or request a trip objective that takes gender ratio into account). In response, the electronic device 102 (e.g., destination information obtainer 116) may utilize an image data analyzer 118 to determine a number of males and a number of females at the venue to determine the gender ratio. In another example, a user may request a number of open tables at the venue (and/or request a trip objective that takes open tables into account). In response, the electronic device 102 may utilize the image data analyzer 118 to determine how many tables are open (e.g., not occupied). For example, computer vision may provide the capability to configure the type of real-time dynamic destination information (based on requests, for example) via classifiers. Accordingly, the real-time dynamic destination information type may be configurable (e.g., not static) in some implementations. Therefore, the real-time dynamic destination information may vary by type and may provide greater flexibility than statically providing only one kind of information (such as parking availability sensor data that is pre-set to only provide information on a number of available spaces, for instance).

In some configurations, the intelligence obtainer 124 may obtain non-service information (e.g., information for one or more sites where site-specific information is not available). For example, only non-service information may be available for one or more sites in some cases. For instance, one or more non-service sites may satisfy one or more trip objectives, but may not be evaluated with one or more evaluation bases due to the lack of in-service information. Destination information for one or more sites where site-specific dynamic destination information (e.g., real-time dynamic destination information is available) may be referred to as in-service information in some configurations.

The processor 112 may include and/or implement a trip planner 120. The trip planner 120 may perform trip planning based on the obtained intelligence. For example, the trip planner 120 may perform trip planning based on destination information (e.g., the real-time dynamic destination information), vehicle information, environment information, and/or road information. Additionally or alternatively, the trip planner 120 may perform trip planning based on the dynamic destination information (e.g., real-time dynamic destination information), the one or more trip objectives, and/or the one or more evaluation bases. In some approaches, trip planning may be performed with one or more in-service sites and/or one or more non-service sites.

In some configurations, the trip planner 120 may identify an association between at least one destination (e.g., site) and one or more trip objectives (e.g., determine one or more potential destinations). The association may indicate that one or more trip objectives may be accomplished (e.g., fulfilled) at one or more destinations (e.g., sites). For example, the trip planner 120 may determine a set of potential destinations (e.g., sites) that may meet one or more trip objectives. For instance, if a trip objective is to go grocery shopping, the trip planner 120 may determine one or more grocery stores. The trip planner 120 may determine the potential destination(s) from one or more sources. For example, the trip planner 120 may access the memory 126, which may include a record (e.g., database) of one or more potential destinations and/or trip objectives that may be accomplished at the destinations (e.g., sites). Additionally or alternatively, the trip planner 120 may request and/or receive potential destination(s) (and/or associated objectives that may be accomplished) from one or more remote devices (e.g., web servers) via the communication interface 108. If the trip objective(s) may be accomplished at a destination (e.g., site), the trip planner 120 may determine (e.g., assign, form, generate, etc.) an association. In some approaches, the destination(s) (e.g., site(s)) may include one or more in-service destinations and/or one or more non-service destinations. In some configurations, the trip planner 120 may provide the one or more potential destinations to the destination information obtainer 116. The destination information obtainer 116 may utilize the potential destination(s) to obtain (e.g., request and/or receive) the destination information (e.g., the real-time dynamic destination information). Additionally or alternatively, the intelligence obtainer 124 may utilize the potential destination(s) (e.g., site(s)) to obtain road information and/or environmental information. In some configurations, obtaining non-service information for one or more non-service sites may be performed in a case that none of the suggested routes is accepted. For example, trip planning may be performed based on comparing the non-service information with in-service information. The electronic device 102 (e.g., trip planner 120, user interface 134, display 132, etc.) may provide one or more alternate routes based on the comparison. In some configurations, obtaining and comparing non-service information and/or suggesting non-service site(s) may be performed without being conditioned on route acceptance. In some configurations, non-service sites may be scored based on a lack of comparability. For example, if an in-service site and a non-service site are at equal distances, the non-service site may be scored lower due to the unknown condition(s) at the site.

In some approaches, the potential destinations may be limited in geographical area. For example, the trip planner 120 may determine potential destinations within a distance (e.g., within a radial distance, within a city, county, state, and/or region, etc.) from the location of the user.

The trip planner 120 may evaluate the one or more potential destinations (e.g., sites) based on the destination information. For example, the trip planner 120 may evaluate the one or more potential destinations and/or one or more combinations of potential destinations (e.g., potential trips) to suggest and/or execute one or more trips. For example, the trip planner 120 may rank a set of potential trips based on a degree to which each of the potential trips satisfies one or more trip objectives in accordance with one or more evaluation bases. For instance, if an evaluation basis is time, the trip planner 120 may rank the potential trips based on the amount of time required for each potential trip. The potential trip that requires the shortest amount of time may be suggested and/or executed.

In some configurations and/or cases, the trip planner 120 may compare one or more in-service destinations (e.g., sites) to one or more non-service destinations (e.g., sites). For example, the one or more in-service destinations may have corresponding site-specific information (e.g., real-time dynamic destination information), whereas the one or more non-service destinations may not have corresponding site-specific information. For instance, the trip planner 120 may determine one or more non-service destinations that have an association with one or more trip objectives, but where site-specific information from the site is unavailable. In one example, the trip planner 120 may compare an in-service destination (e.g., site A) with a non-service destination (e.g., site B), because both site A and site B meet a trip objective (e.g. coffee). In this example, the trip planner 120 may compare available information (e.g., distances to site A and site B). For instance, the trip planner 120 may provide site B as a suggestion along with site A because site B is closer than site A, even though site B does not have any on-site destination information (e.g., real-time dynamic destination information) available. In some approaches, the suggestion may indicate that site B does not have on-site destination information available (if site B cannot be fully evaluated due to lack of on-site destination information, for example).

In some approaches, the trip planner 120 may provide an output to the display 132 (e.g., user interface 134) indicating the suggested trip and/or trip for execution. The trip planner 120 may provide a list of ranked potential trips to the user interface 134 for selection in some approaches. Additionally or alternatively, the trip planner 120 may send one or more suggested trips to another device (e.g., to a smartphone, to a computer, etc.).

As described above, the electronic device 102 (e.g., processor 112, intelligence obtainer 124, etc.) may obtain path information, vehicle information, and/or environment information. In some configurations, the trip planner 120 may perform trip planning based on the path information, vehicle information, and/or environment information in combination with the destination information (e.g., the real-time dynamic destination information) in some approaches. For example, path travel time in combination with parking time and transaction time may be taken into account for a grocery shopping trip.

In some configurations, obtaining the destination information (e.g., real-time dynamic destination information) may be based on computer vision and image data of one or more sites. For example, the electronic device 102 may obtain one or more images (e.g., still images, burst images, video, etc.) from one or more sites and may perform computer vision analysis on the image(s) to determine real-time dynamic destination information. Additionally or alternatively, a remote device may obtain one or more images and/or may perform computer vision analysis to determine real-time dynamic destination information, which the electronic device 102 may request and/or receive. More detail regarding obtaining image(s) and/or performing computer vision analysis is given as follows, which may be performed by the electronic device 102 and/or one or more remote devices.

The processor 112 may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 or may be captured from one or more remote camera(s).

In some configurations, the image obtainer 114 may request and/or receive one or more images (e.g., image frames, etc.). For example, the image obtainer 114 may request and/or receive one or more images from a remote device (e.g., external camera(s), remote server, remote electronic device, etc.) via the communication interface 108. The images obtained from the cameras may be utilized by the electronic device 102 for computer vision analysis (and/or determining real-time dynamic destination information).

The processor 112 may include and/or implement an image data analyzer 118. The image data analyzer 118 may perform analysis (e.g., computer vision analysis, scene analysis, classification analysis, etc.) on the one or more images. In particular, the image data analyzer 118 may perform object recognition, object tracking, face detection, face recognition, pedestrian detection, optical character recognition, scene understanding, etc. The analysis may be utilized to determine the destination information (e.g., real-time dynamic destination information). For example, the analysis (e.g., computer vision analysis) may be utilized to determine a time aspect, population aspect, product aspect, service aspect, and/or site feature aspect. For instance, the analysis may indicate a parking lot occupancy (which may be utilized to estimate parking time, for example), may indicate a number of people in line at a grocery store (which may be utilized to estimate transaction time), may indicate a number of people, may indicate demographics (e.g., genders, ages, etc.), may indicate product availability, may indicate site cleanliness, may indicate site lighting, etc. Examples of computer vision analysis are provided in one or more of FIGS. 6-7.

In some configurations, the trip planner 120 may perform trip planning based on forecasting. For example, the trip planner 120 may forecast expected destination information based on the real-time dynamic destination information and/or historical destination information. For instance, historical destination information may indicate historical patterns of site activity (e.g., high or low traffic times at a restaurant, grocery store, etc.). In one particular example, the trip planner 120 may determine that for a potential trip, it will require an hour to arrive at a grocery store and that although the real-time dynamic destination information currently indicates low traffic at the grocery store, the historical destination information indicates that high traffic typically occurs in an hour from the current time. Such forecasting may be taken into account when ranking potential destinations and/or potential trips in some configurations.

In some configurations, the trip planner 120 may perform trip planning additionally based on historical experience information. For example, the electronic device 102 (e.g., user interface 134) may receive information regarding feedback on one or more trips. The historical information may indicate a user satisfaction with the trip(s), feedback regarding the accuracy of the real-time dynamic destination information, user preferences, etc. Additionally or alternatively, the historical information may include experience information (e.g., rating information, etc.) from one or more network-available resources (e.g., websites, social media, etc.).

In some cases, trip execution may deviate from the planned trip. Additionally or alternatively, a user may add or remove one or more destinations during a trip. Additionally or alternatively, the dynamic destination information (e.g., real-time dynamic destination information) may vary to a degree that may warrant modifying and/or updating trip planning. For example, a driver (e.g., user) may take a different route than the planned route. If the driver deviates from the route by a threshold degree, the electronic device 102 may update trip planning and/or may suggest changes to the trip. For example, if the user has traveled closer to a grocery store with faster checkout, the electronic device 102 may suggest a trip change that replaces the initial grocery store destination suggestion with the updated grocery store. In another example, the electronic device 102 may receive an input indicating a destination addition or removal. The electronic device 102 may update trip planning based on the destination additional or removal. In another example, calendar information may indicate that a meeting has changed location or has been cancelled. The electronic device 102 may update trip planning to account for the location change and/or cancellation.

As described herein, one or more (e.g., different) evaluation bases may be utilized in some approaches. One object of some configurations of the systems and methods disclosed herein may be to help a user improve trip planning (e.g., optimize a driving route). There may be several evaluation bases that may be considered, which may be indicated by the user interface 134 that includes user preferences for a number of situations. Some example cases are given as follows.

In one case, the evaluation basis may be to minimize drive time (e.g., get from point A to point B as quickly as possible). In a second case, the evaluation basis may be to maximize a safe route considering inclement weather (e.g., get from point A to point B on the safest road, which might be a road that was plowed, but otherwise may take longer to travel). It should be noted that safety and speed may be highly correlated (e.g., the safest route may also be the fastest route) in some instances. In a third case, the user may be informed whether one or more options should be considered if there is an anomaly (e.g., a car accident or severe weather conditions). In some approaches, the user may have entered alternate trip objectives (e.g., preferences in case of an anomaly) of stopping to get coffee, stopping at the gym, or stopping to pick up dry cleaning. In a fourth case, a user may query the electronic device 102 for the time impact for inserting a task into the commute (e.g., stopping to get coffee). In a fifth case, the evaluation basis may be to maximize fuel efficiency (which may be correlated with the first and/or second cases described above). In a sixth case, the evaluation basis may be to maximize rewards (e.g., reduce costs). This may become relevant as real-time coupon offers are presented, as ride-sharing services become common, and/or as variable pricing for fast lane access becomes more common. A user may desire to reduce costs by taking on a passenger (within constraints such as "only if it adds 5 minutes or less to the commute," for example), earning credits for using the slow lane (e.g., "only if the user receives $5 worth of credits"), or taking advantage of a real-time coupon offer (e.g., "only if coffee is 1 discounted and/or only adds 5 minutes to the commute").

Other factors may be utilized for planning. One or more factors that may be considered in trip planning (e.g., calculation of end-to-end drive time) may include one or more of the following. Cloud-based and/or publically-available real-time traffic conditions may be utilized. Beacon-based (e.g., ambient) sensors in retail stores that indicate wait times may be utilized. Historical information based on an individual's past experiences with a retail store (e.g., the average amount of time it takes to park, enter the grocery store, walk to the donut section, retrieve a dozen donuts, walk to cashier, pay, walk to car, and get back on the road, etc.) may be utilized. It should be noted that individual historical information may not include group (e.g., aggregate) historical information in some configurations. For example, individual historical information may be specific to an individual user, and may not reflect information about a group or aggregate population. Cloud-based forecasting of wait times in retail stores (or the like) based on one or more factors (e.g., time of year, day, time, location, weather, external events (e.g., a nearby sporting event just ended), and/or impact of modifying real-time incentives (e.g., sending out a coupon that may have the impact of increasing a wait time at the counter), etc.) may be utilized.

Monetary considerations may be considered in some approaches. For example, some configurations of the systems and methods disclosed herein may determine (e.g., estimate) the overall monetary impact of a trip (e.g., route decision). The overall monetary impact may be based on one or more of the following factors. Fuel usage and pricing (also factoring in make/model of vehicle and/or loading, etc.) may be utilized. Potential savings from using a coupon may be utilized. Impact of picking up other passengers (including added time/distance, added weight impact on fuel, and/or off-setting payment credit (e.g., how much payment the driver receives), for example) may be utilized. The impact of paying for car pool lane access or a toll road may be utilized. Comparison with other options such as public transit or being a rider in a ride-sharing service may be utilized.

Some configurations of the systems and methods disclosed herein may provide a feature that provides the user with an alert (in the morning before leaving home, for example). For instance, the alert may indicate (e.g., say) one or more of the following (in a simple format, for example):

Good morning, your route options today are as follows:
Drive yourself (Interstate 5): 45 minutes, $3.50 fuel cost
Drive yourself (Interstate 805): 47 minutes, $3.75 fuel cost
Drive yourself (Interstate 805 with a stop for 1 passenger) 52 minutes, $1.50 profit
Take the bus: 64 minutes, $2.50 cost Additionally or alternatively, there may be updates during the course of the trip (e.g., commute) with beneficial options. For example, if an accident has occurred, the electronic device 102 may recommend that the driver pick up a passenger to use the car pool lane (that is not blocked) or may recommend taking another route entirely.

In some configurations, the electronic device 102 (e.g., trip planner 120) may determine a selection and/or weighting of one or more types of information. For example, the electronic device 102 (e.g., trip planner 120) may determine a weighting and/or a selection of destination information (e.g., real-time dynamic destination information), vehicle information, environment information, road information, path information, and/or historical information (e.g., one or more of historical destination information, historical trend information, individual historical experience information, etc.) for trip planning. Additionally or alternatively, the electronic device 102 may determine a weighting and/or a selection of subsets of information. For example, the electronic device 102 may determine a selection of and/or weighting of a time aspect, a population aspect, a product aspect, a service aspect, and/or a site feature aspect. For instance, a user may desire to find a most popular club within a city, regardless of a product aspect or travel time. In some approaches, the selection and/or weighting may be determined based on user-configurable settings and/or based on user behavior (e.g., acceptance or non-acceptance of one or more suggested routes). The weighting may control a degree of impact that a particular type of information may have on trip planning. For example, information types with less weight may have a lesser impact on trip planning, whereas information types with higher weight may have a greater impact on trip planning. The weighting may be determined and/or refined based on training.

In some configurations, the electronic device 102 (e.g., trip planner 120, a refiner, etc.) may refine trip planning based on feedback. For example, feedback may include an indication of whether a suggested route is selected (e.g., followed) or not, one or more changes to a suggested route, and/or an indication of suggested route quality. For instance, the electronic device 102 may receive feedback from the user interface 134 and/or from a remote device. Additionally or alternatively, the electronic device 102 may detect whether a suggested route is followed (without an explicit indication, for example). For instance, the electronic device 102 may utilize navigation devices and/or techniques (e.g., inertial navigation, GPS, location detection based on wireless stations (e.g., Wi-Fi, cellular, etc.) to determine whether the device 102 is following a suggested route. Following the suggested route may be interpreted as an acceptance of a suggested route, whereas not following the suggested route may be interpreted as not accepting a suggested route and/or as modifying a suggested route. Acceptance of a suggested route, a change to a suggested route, and/or non-acceptance of a suggested route may be utilized as feedback. For example, the electronic device 102 (e.g., trip planner 120, refiner, etc.) may modify trip planning (for future trips, for instance) based on the feedback. In some configurations, the electronic device 102 (e.g., trip planner 120, refiner, etc.) may change weighting for one or more possible destinations and/or routes (e.g., trips) based on the feedback. For example, the electronic device 102 (e.g., trip planner 120, refiner, etc.) may increase weights for one or more possible destinations and/or routes that a user follows and/or selects. Additionally or alternatively, the electronic device 102 (e.g., trip planner 120, refiner, etc.) may reduce weights for one or more possible destinations and/or routes that a user does not follow and/or does not select.

In some configurations, the electronic device 102 (e.g., trip planner 120, etc.) may utilize (e.g., consider) one or more factors to influence weighting. One example of a factor may be an importance (e.g., user perceived importance) of one or more destinations. In some approaches, the electronic device 102 may receive destination ratings (e.g., a user may manually rate destinations or places) on a scale of 1 to 5 (with 1 being unimportant and 5 being very important). For example, a user might provide destination ratings, which may be received by the electronic device 102 (e.g., destination information obtainer 116, trip planner 120, etc.) as follows: Work: 5; School: 5; Gas Station: 4; Coffee Shop: 3; Donut Shop: 1.

Additionally or alternatively, the electronic device 102 (e.g., trip planner 120) may automatically set destination ratings. For example, the trip planner 120 (e.g., algorithm) may apply predetermined values (e.g., Work and School are important (with ratings of 5), the Gas Station is fairly important (with a rating of 4), and the Donut Shop is not important (with a rating of 1), etc.). In an additional or alternative approach, the electronic device 102 (e.g., trip planner 120, refiner, etc.) may automatically learn from the user's behavior. For example, if the user is willing to accept significant negative consequences (e.g., the user demonstrates pattern of paying more for fuel to avoid traffic) to arrive at a destination, then the destination may be rated as very important. Or, if a user demonstrates a pattern of always stopping for coffee on the way to work, the Coffee Shop may be rated as very important (with a rating of 4 or 5, for instance). In another example, if a modest consequence occurs (e.g., slightly more traffic) and the user avoids a certain destination (e.g., the Coffee Shop), then the destination (e.g., the Coffee Shop) may be rated lower (with a rating of 2 or 3, for instance), because avoiding the destination may indicate that it is not so important to that user. Accordingly, accepting or rejecting (e.g., avoiding) a route may provide an indication of user-perceived importance, which may be utilized by the trip planner 120 in planning routes. Greater weightings may be applied for higher rated destinations and/or lower weightings may be applied for lower rated destinations.

As discussed above, route acceptance and/or route rejection (e.g., avoidance) may impact training. For example, if a user accepts an alternative route and the benefits are fairly consistent (e.g., the route is typically faster), then the route may be weighted higher. If the user does not accept an alternative route (with consistent benefits, for instance), perhaps there is a reason that is unaccounted for by the electronic device 102 (e.g., trip planner 120, trainer, refiner, etc.). In some approaches, the electronic device 102 (e.g., trip planner 120, trainer, refiner, etc., through the user interface 134) may output a query (with audio, imagery, and/or text, for example). For instance, the electronic device 102 may query a user with text and/or audio that says "I see you did not take the suggested shorter route. Would you like to consider it in the future? If not, why?" The electronic device 102 may receive user input (e.g., speech input, text input, touchscreen input, etc.) that may be utilized for training (the trip planner 120, refiner, etc.). For example, the electronic device 102 may receive text and/or audio indicating that "I prefer the slightly slower, but significantly more scenic route." It should be noted that the electronic device 102 (e.g., trip planner 120, refiner, etc.) may know aspects (e.g., pros and/or cons) of different routes and may learn from the user's choice. In some approaches, different aspects (e.g., scenery, time efficiency, cost, etc.) of one or more routes may be rated (on a scale of 1-100, for instance). For example, route A may have a scenery rating of 90, a time efficiency rating of 80, and a cost (e.g., monetary cost, tolls, etc.) rating of 20. Route B may have a scenery rating of 40, a time efficiency rating of 90, and a cost rating of 80. If the user selects route A, then the electronic device 102 (e.g., trip planner 120, refiner, etc.) may determine that the user values scenery over efficiency, etc. Accordingly, the electronic device 102 (e.g., trip planner 120, refiner, etc.) may more heavily weight destinations and/or routes with higher scenery ratings.

In some configurations, trip planning may be performed by calculating an evaluation score based on a set of evaluation bases and associated weights. For example, the evaluation score may be calculated by multiplying each evaluation basis with an associated weight and summing the resulting products. Each evaluation basis may be represented by a number scale with higher numbers representing better scores (e.g., less drive time, greater safety, greater fuel efficiency or less consumption, etc.) and lower numbers representing worse scores.

Trip planning may additionally or alternatively include calculating an objective score. For example, the objective score may be calculated by multiplying each trip objective with an associated weight and summing the resulting products. Each objective may be represented by a number scale with higher numbers representing better individual scores (e.g., whether the objective is indicated for a trip, etc.) and lower numbers representing worse individual scores.

Trip planning may additionally or alternatively include calculating an intelligence score. For example, the intelligence score may be calculated by multiplying each intelligence item (e.g., vehicle information, environment information, road information, and/or destination information) with an associated weight and summing the resulting products. Each intelligence item may be represented by a number scale with higher numbers representing better individual scores (e.g., good route weather, good roads, favorable destination information, etc.) and lower numbers representing worse individual scores.

In some approaches, an overall trip planning score may be calculated as a sum of two or more of the evaluation score, objective score, and/or intelligence score. The route and/or destination with a highest overall trip planning score may be suggested. Additionally or alternatively, a set of destinations with the highest overall trip planning scores may be suggested. The set destinations with highest overall trip planning scores may be ranked and/or prioritized. It should be noted that one or more of the evaluation bases, trip objectives, and/or intelligence items may correspond to each destination. For instance, each drive time evaluation basis may be based on the actual estimated drive time for each destination.

In some configurations, the electronic device 102 (e.g., processor 112, intelligence obtainer 124, trip planner 120, image data analyzer 118, etc.) may obtain user model data. For example, the electronic device 102 (e.g., image data analyzer 118) may perform computer vision analysis on one or more images of one or more users (e.g., a vehicle driver and any passenger(s)). The computer vision analysis may provide one or more kinds of user model data such as user age, user gender, etc. Additionally or alternatively, the electronic device 102 may determine a user location (e.g., home location, home neighborhood, home city, etc.) and/or a time. The user model data may be utilized to perform training for trip planning and/or refining. For example, if the user model data indicates a probability of a preference for one or more destinations and/or routes, weighting for trip planning may be adjusted to take the user model data into account. The trip planning may be additionally or alternatively based on the user model data. For example, the weighting produced (e.g., adjusted) based on the user model data may be utilized in trip planning More details are provided in connection with FIG. 9.

It should be noted that user model data may differ between users. Accordingly, the electronic device 102 (e.g., image data analyzer 118) may recognize (e.g., identify) each user and utilize the corresponding user model data for that user. For example, if two different drivers share a car, the electronic device 102 may identify the users and handle each differently.

In some configurations, the electronic device 102 (e.g., trip planner 120, trainer, refiner, etc.) may perform training. For example, the electronic device 102 may determine and/or refine one or more weights for trip planning based on training. In some approaches, the electronic device 102 may determine and/or refine the weight(s) based on one or more received inputs and/or data collection (e.g., requested destinations, accepted routes, rejected routes, trip objectives, evaluation bases, intelligence items (e.g., real-time dynamic destination information), user model data, etc.). Performing training may improve trip planning in accordance with user preference and/or trips taken over time. In some configurations, the electronic device 102 (e.g., memory 126) may store prior training information (e.g., a prior training database). The prior training information (e.g., weights) may be accessed by the trip planner 120 in order to perform trip planning. The prior training information may be refined (e.g., updated) based on one or more received inputs and/or data collection.

It should be noted that one or more of the elements or components of the electronic device 102 may be combined and/or divided. For example, one or more of the trip objective information obtainer 122, the intelligence obtainer 124, the destination information obtainer 116, the trip planner 120, the image obtainer 114, and/or the image data analyzer 118 may be combined. Additionally or alternatively, one or more of the trip objective information obtainer 122, the intelligence obtainer 124, the destination information obtainer 116, the trip planner 120, the image obtainer 114, and/or the image data analyzer 118 may be divided into elements or components that perform a subset of the operations thereof.

Figure 2:
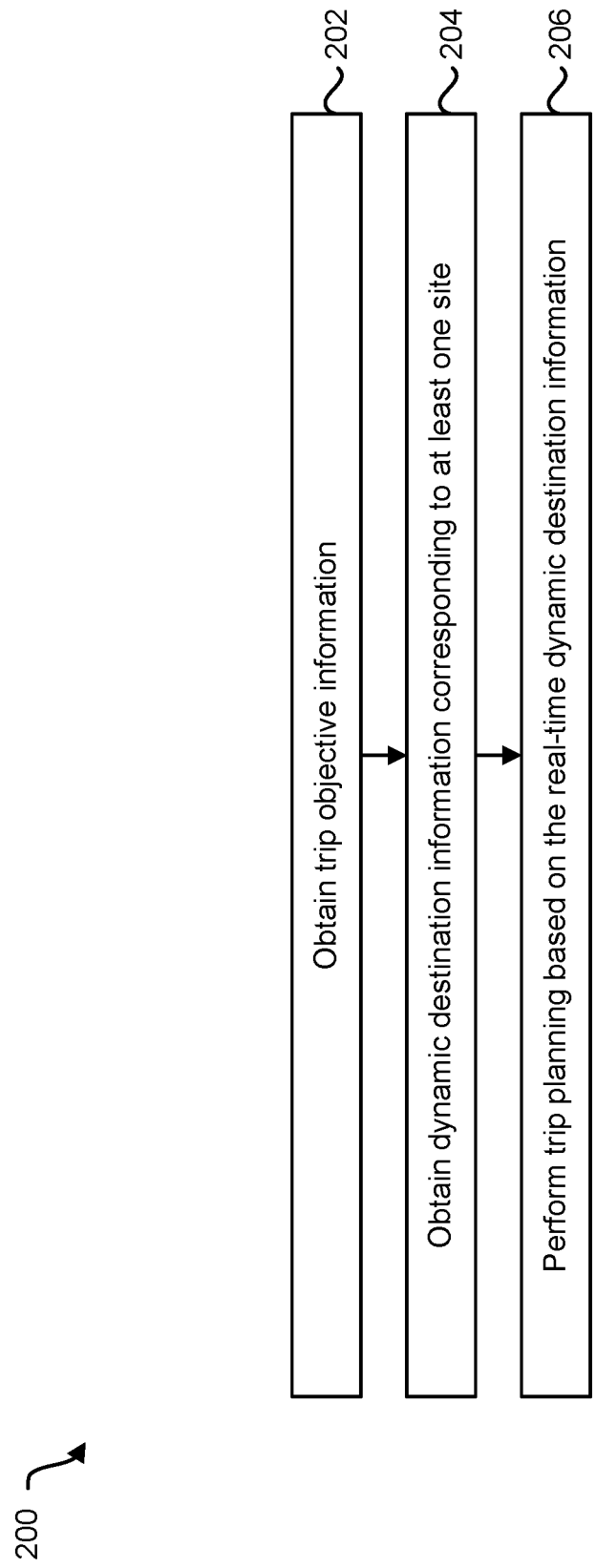
FIG. 2 is a flow diagram illustrating one configuration of a method for trip planning.

FIG. 2 is a flow diagram illustrating one configuration of a method 200 for trip planning. The method 200 may be performed by the electronic device 102, for example.

The electronic device 102 may obtain 202 trip objective information. This may be accomplished as described above in connection with FIG. 1. For example, the electronic device 102 may obtain trip objective information from a user interface and/or from a remote device. For instance, the electronic device 102 may obtain one or more trip objectives. Additionally or alternatively, the electronic device 102 may obtain one or more evaluation bases. More detail is provided in connection with one or more of FIGS. 3-5.

The electronic device 102 may obtain 204 dynamic destination information (e.g., real-time dynamic destination information) corresponding to at least one site. This may be accomplished as described above in connection with FIG. 1. For example, the electronic device 102 may perform computer vision analysis on one or more images to determine the real-time dynamic destination information and/or may receive real-time dynamic destination information from one or more remote devices. More detail is provided in connection with one or more of FIGS. 3-7.

The electronic device 102 may perform 206 trip planning based on the real-time dynamic destination information. This may be accomplished as described in connection with FIG. 1. For example, the electronic device 102 may determine one or more potential destinations and/or may evaluate the one or more potential destinations (e.g., potential trips) based on one or more evaluation bases. More detail is provided in connection with one or more of FIGS. 3-5. In some configurations, the electronic device 102 may provide one or more suggested routes based on the trip planning.

Figure 3:
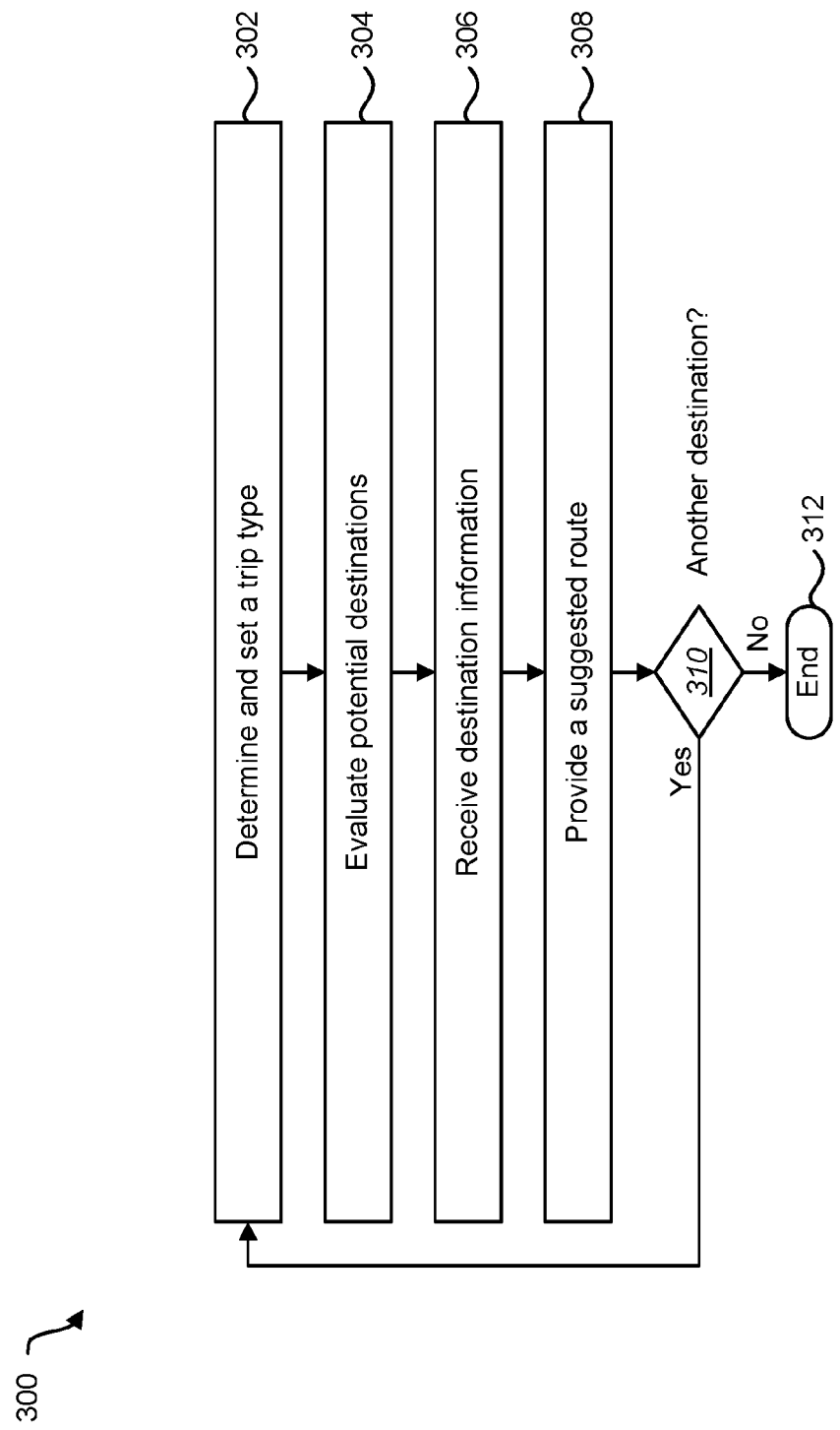
FIG. 3 is a flow diagram illustrating another configuration of a method for trip planning.

FIG. 3 is a flow diagram illustrating another configuration of a method 300 for trip planning. The method 300 may be performed by the electronic device 102, for example.

The electronic device 102 may determine and set 302 a trip type. This may be accomplished as described above in connection with FIG. 1. For example, the electronic device 102 may obtain trip objective information. The trip objective information may indicate a trip type (e.g., grocery shopping trip, commute to work, dining out, take out pickup, etc.). For example, the trip objective information may indicate one or more desired objectives (e.g., buy certain products, pick up breakfast on the way to work, see a particular movie, socialize, etc.).

The electronic device 102 may evaluate 304 potential destinations. This may be accomplished as described above in connection with FIG. 1. For example, the electronic device 102 may determine a set of potential destinations (e.g., potential trips) based on the trip objective information (e.g., trip type). In particular, the trip objective information may imply one or more potential destinations to accomplish one or more trip objectives. For example, certain products may be purchased at one or more certain destinations, breakfast may be provided at one or more destinations, work may indicate a final destination, a movie may be played at certain destinations, etc. In some configurations, the electronic device 102 may search a database of destinations to match the trip objective(s) with one or more destinations. Additionally or alternatively, the electronic device 102 may query one or more network sources (e.g., Internet websites, search engines, remote server(s), etc.) for one or more destinations that may satisfy the trip objective(s). The search and/or query may result in one or more destinations that may satisfy the trip objective(s).

The electronic device 102 may receive 306 destination information corresponding to one or more sites. This may be accomplished as described in connection with FIG. 1. For example, the electronic device 102 may determine, request, and/or receive real-time dynamic destination information. In some configurations, the electronic device 102 may gather intelligence corresponding to one or more potential destinations. For example, the electronic device 102 may request and/or receive sensor data (e.g., image data, microphone data, beacon data, etc.) corresponding to one or more sites. The electronic device 102 may obtain real-time dynamic destination information based on the sensor data. For instance, the electronic device 102 may perform computer vision analysis on the image data to determine real-time dynamic destination information. In some configurations, the electronic device 102 may gather other intelligence. For example, the electronic device 102 may obtain vehicle information, environment information, and/or road information.

The electronic device 102 may provide 308 a suggested (e.g., recommended) route. This may be accomplished as described in connection with FIG. 1. For example, the electronic device 102 may evaluate (e.g., rank) one or more potential destinations and/or trips. Evaluating the one or more potential destinations may be based on the real-time dynamic destination information and/or other intelligence. For example, the electronic device 102 may evaluate how potential destinations and/or combinations of destinations satisfy one or more trip objectives in accordance with one or more evaluation bases. In some configurations, the electronic device 102 may provide 308 a recommended route that best satisfies the evaluation bases. Additionally or alternatively, the electronic device 102 may provide a ranked set of recommended routes.

The electronic device 102 may determine 310 whether there is another destination. For example, the electronic device 102 may determine whether another destination is to be added to a trip (e.g., if there are multiple trip destinations and/or if an additional destination is requested from a user, etc.). If there are one or more additional destinations, the electronic device 102 may repeat one or more steps 302, 304, 306, 308 to factor the additional destination(s) into the trip. If there are no additional destinations, operation may end 312.

Figure 4:
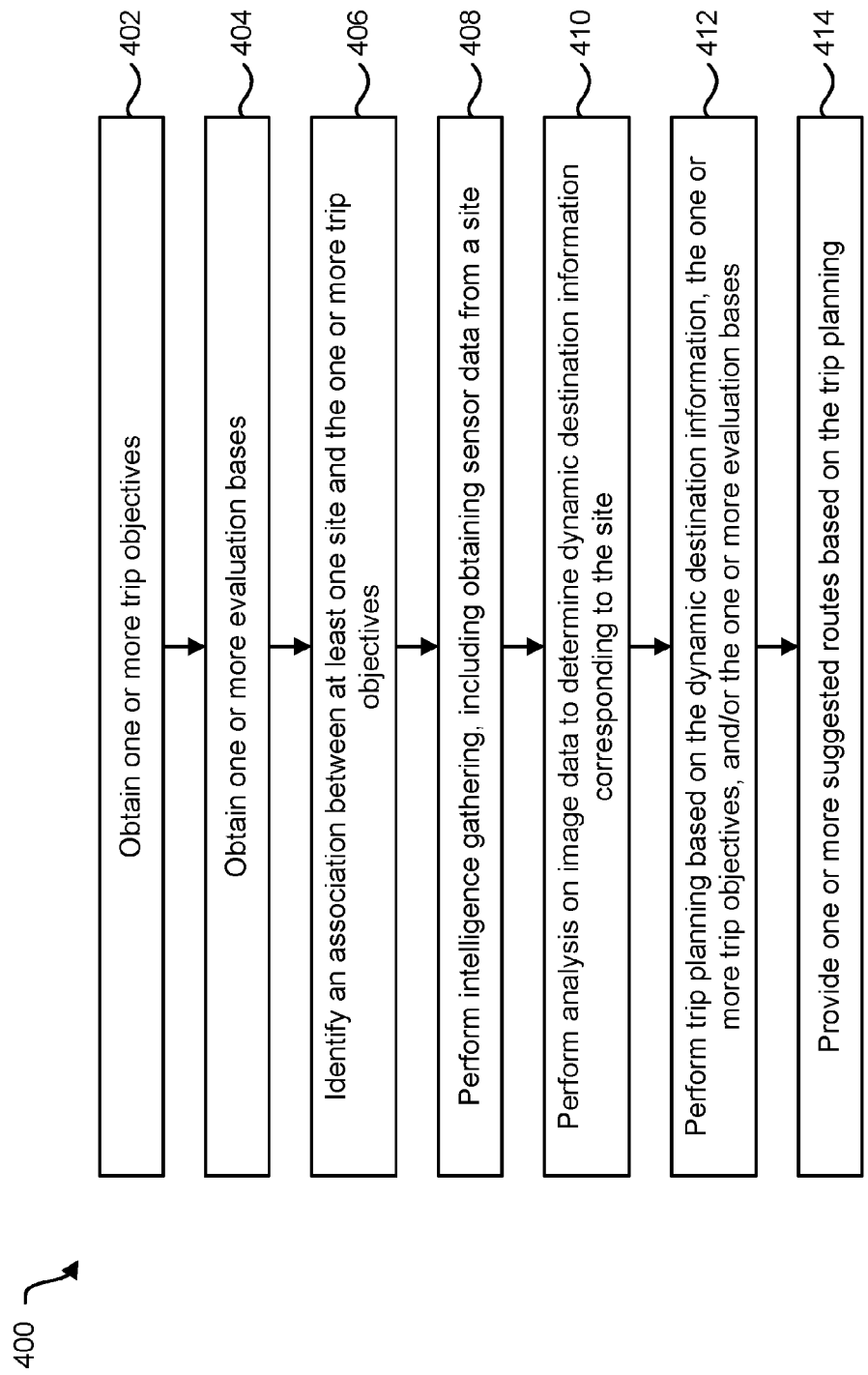
FIG. 4 is a flow diagram illustrating a more specific configuration of a method for trip planning.

FIG. 4 is a flow diagram illustrating a more specific configuration of a method 400 for trip planning. The method 400 may be performed by the electronic device 102, for example.

The electronic device 102 may obtain 402 one or more trip objectives. This may be accomplished as described above in connection with one or more of FIGS. 1-3. For example, the electronic device 102 may obtain one or more trip objectives from a user interface and/or from a remote device.

The electronic device 102 may obtain 404 one or more evaluation bases. This may be accomplished as described above in connection with one or more of FIGS. 1-3. For example, the electronic device 102 may obtain one or more evaluation bases from a user interface and/or from a remote device.

In some configurations, the electronic device 102 may identify 406 an association (e.g., one or more associations) between at least one site and the one or more trip objectives. This may be accomplished as described in connection with FIG. 1. For example, the electronic device 102 may determine one or more potential destinations to fulfill the trip objective(s). For instance, the one or more trip objectives may imply one or more destination types (e.g., one or more potential destinations) for fulfilling the trip objective(s). In some approaches, the electronic device 102 may search for one or more potential destinations or sites with objective information (e.g., services offered, products offered, activities offered, etc.) that matches the trip objective(s).

The electronic device 102 may perform 408 intelligence gathering. Performing 408 intelligence gathering may include obtaining sensor data from at least one site. For example, the electronic device 102 may perform 408 intelligence gathering from one or more of the potential destinations. Accordingly, the intelligence gathering (e.g., obtaining real-time dynamic destination information) may vary and/or may be based on a user request. The sensor data may include image data (from one or more image sensors, cameras, etc.). This may be accomplished as described above in connection with one or more of FIGS. 1-3. For example, the electronic device 102 may request and/or receive image data from one or more fixed and/or mobile on-site sensors (e.g., image sensors, cameras, etc.). In some approaches, performing 408 intelligence gathering may be based on the identified association(s). For example, the electronic device 102 may gather intelligence (e.g., real-time dynamic destination information) for one or more sites with an association with the trip objective(s). For instance, the electronic device 102 may gather intelligence only from one or more sites with an association with the trip objective(s) and/or may exclude other sites without an association.

The electronic device 102 may perform 410 analysis (e.g., computer vision analysis, scene analysis, classification analysis, etc.) on the image data to determine dynamic destination information (e.g., real-time dynamic destination information) corresponding to one or more sites. This may be accomplished as described in connection with one or more of FIGS. 1-3. For example, the electronic device 102 may perform one or more of face detection, face recognition, pedestrian detection, object detection, object recognition, object tracking, scene understanding, optical character recognition, gender detection, emotion detection, motion analysis, and/or clothing analysis on the image data. For instance, the analysis may indicate a number of people (e.g., patrons, cashiers, pedestrians, shoppers, a number of people in line, etc.), an inventory (e.g., one or more products, stock amounts, etc.), a number of vehicles, an arrangement of vehicles (e.g., parking space availability), gender of one or more people, emotional state of one or more people, sobriety of one or more people, a presence or absence of one or more amenities, etc. The analysis may be utilized to determine dynamic destination information. For example, the analysis of the on-site image data may directly indicate real-time dynamic destination information (e.g., number of people, number of men or women, etc.). Additionally or alternatively, the electronic device 102 may perform additional processing on the analysis results to determine the dynamic destination information (e.g., real-time dynamic destination information). For example, the electronic device 102 may estimate a cashier line wait time based on the number of people in the line and/or the number of products in line for checkout indicated by the analysis.

The electronic device 102 may perform 412 trip planning based on the real-time dynamic destination information, the one or more trip objectives, and/or the one or more evaluation bases. This may be accomplished as described in connection with one or more of FIGS. 1-3. For example, the electronic device 102 may evaluate the one or more potential destinations (e.g., potential trips) based on one or more evaluation bases. For instance, the electronic device 102 may determine which potential destination (or combination of potential destinations) may achieve the trip objective(s) with the least amount of time and/or money. Additionally or alternatively, the electronic device 102 may determine which potential destination (or combination of potential destinations) has the fewest people and best lighting.

The electronic device 102 may provide 414 one or more suggested routes based on the trip planning. This may be accomplished as described in connection with one or more of FIGS. 1-3. For example, the electronic device 102 may present one or more suggested routes on a display. Additionally or alternatively, the electronic device 102 may send (e.g., transmit) the one or more suggested routes to another device (e.g., a remote device).

Figure 5:
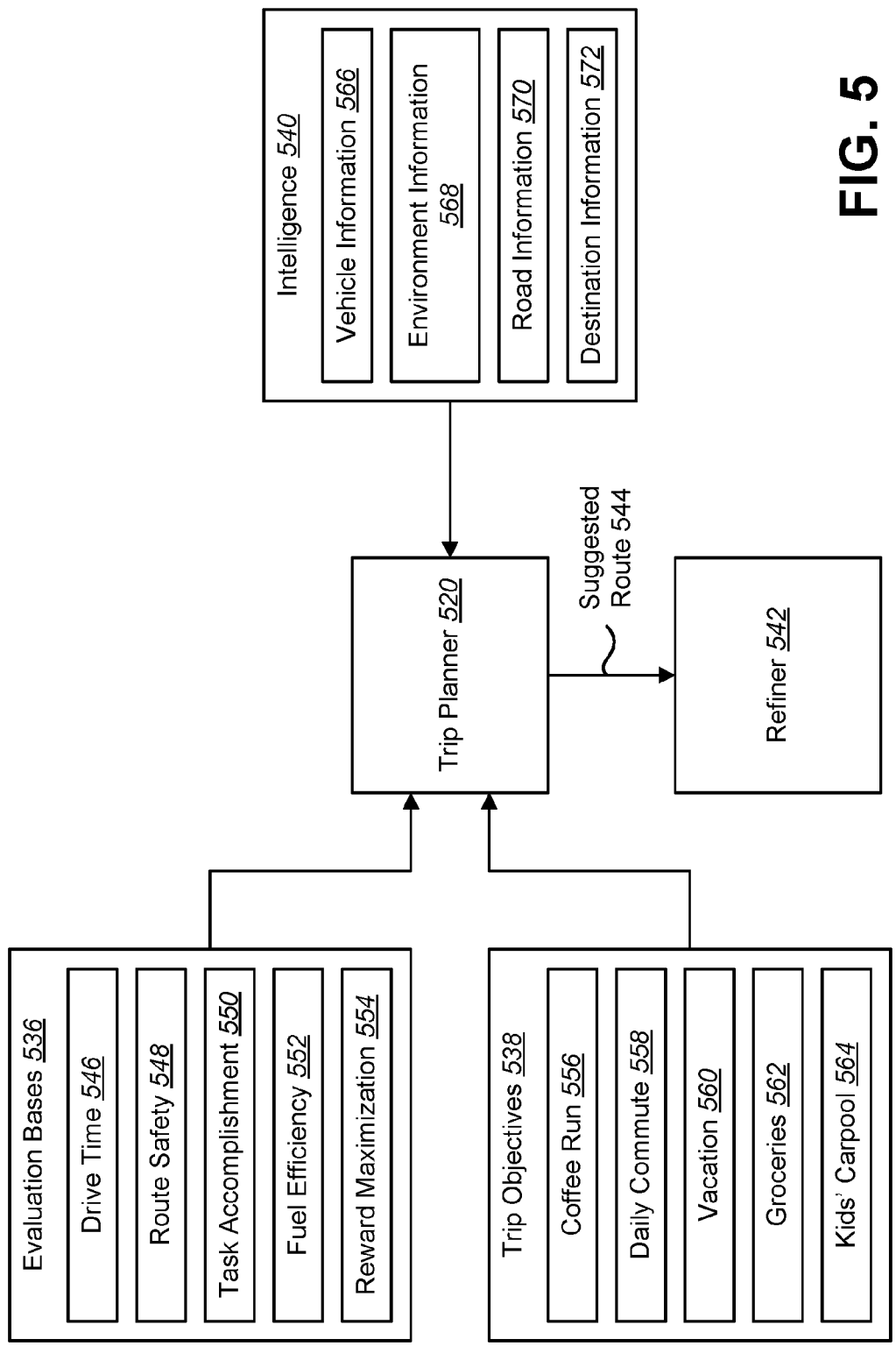
FIG. 5 is a block diagram illustrating an example of trip planning.

FIG. 5 is a block diagram illustrating an example of trip planning. The electronic device 102 described in connection with FIG. 1 may operate in accordance with the block diagram of FIG. 5 in some configurations. In this example, some potential evaluation bases 536 may include drive time 546, route safety 548, task accomplishment 550, fuel efficiency 552, and reward maximization 554. Some potential trip objectives 538 may include a coffee run 556, daily commute 558, vacation 560, groceries 562, and kids' carpool 564. One or more of the evaluation bases 536 and trip objectives 538 may be provided to a trip planner 520 (e.g., route analyzer). The trip planner 520 may be one example of the trip planner 120 described in connection with FIG. 1.

Examples of intelligence 540 are also illustrated in FIG. 5. The intelligence 540 may be obtained by an intelligence obtainer (e.g., the intelligence obtainer 124 described in connection with FIG. 1). For example, an intelligence obtainer may obtain (e.g., gather) intelligence 540. Some examples of intelligence 540 may include vehicle information 566, environment information 568, road information 570, and destination information 572.

In some configurations, examples of vehicle information 566 may include fuel remaining, engine temperature, engine status, tire information, and/or cargo weight, etc. Examples of the environment information 568 may include visibility (e.g., fog) and/or weather conditions, etc. Examples of the road information 570 may include traffic, road condition (e.g., potholes, loose gravel, etc.), construction (e.g., closed lanes), obstructions, and/or carpool lane availability, etc. Road information may be an example of path information. Destination information 572 (e.g., real-time dynamic destination information) may be obtained as described in connection with one or more of FIGS. 1-4. The destination information may vary based on the destination. Some examples of destination information are provided in connection with FIGS. 6 and 7. The vehicle information 566, environment information 568, road information 570, and/or destination information 572 may be provided to the trip planner 520.

The trip planner 520 may perform trip planning (e.g., route analysis) based on the evaluation bases 536, the trip objectives 538, and the intelligence 540. As described in connection with FIG. 1, trip planning may produce one or more suggested routes 544. The suggested route(s) 544 may be presented on a display and/or transmitted to another device (e.g., a remote device).

In some configurations, trip planning may be performing in accordance with the following. For example, the trip planner 520 (e.g., algorithm) may perform trip planning in accordance with Equation (1).

$$(W_{DriveTime} \times E_{DriveTime}) + (W_{Safety} \times E_{Safety}) + (W_{Task} \times E_{Task}) + (W_{Fuel} \times E_{Fuel}) + (W_{Reward} \times E_{Reward}) = E_{Score} \quad (1)$$

In Equation (1), $E_{DriveTime}$ may represent the drive time 546 evaluation basis and $W_{DriveTime}$ may represent a corresponding weight. Additionally, $E_{Safety}$ may represent the route safety 548 evaluation basis and $W_{Safety}$ may represent a corresponding $E_{Task}$ may represent the task accomplishment 550 evaluation basis and $W_{Task}$ may represent a corresponding weight, $E_{Fuel}$ may represent the fuel efficiency 552 evaluation basis and $W_{Fuel}$ may represent a corresponding weight, and $E_{Reward}$ may represent the reward maximization 554 evaluation basis and $W_{Reward}$ may represent a corresponding weight. $E_{score}$ may represent the final evaluation score.

For example, each of the evaluation bases 536 may be assigned a corresponding weight, W. Each weight may be a number within a range (e.g., between 0.0 and 1.0, such as 0.5). Each weight may indicate the importance of the corresponding evaluation basis. Each E denotes an evaluation basis (e.g., term). Each evaluation basis may be a number where a higher number indicates a better score and a lower number indicates a worse score. For example, an $E_{DriveTime}$ of 1 minute may have a higher value than an $E_{DriveTime}$ of 1 hour. Accordingly, each E may be on some number scale (e.g., 0 to 1.0, 0 to 10, 0 to 100, etc.). For example, shorter drive times may map to higher $E_{DriveTime}$ values and longer drive times may map to lower $E_{DriveTime}$ values. Accordingly, a weight indicating high importance multiplied by an evaluation basis with a high score (e.g., an important evaluation basis) may yield a relatively high number or value. Conversely, a weight indicating low importance multiplied by an evaluation basis with a low score (e.g., an unimportant evaluation basis) may yield a relatively low number or value. Adding each of the products may yield a weighted sum. For example, the evaluation score $E_{Score}$ may be a weighted sum. The evaluation bases 536 (e.g., $E_{Score}$) may contribute to an overall score in some approaches.

Additionally or alternatively, the trip planner 520 (e.g., algorithm) may perform trip planning in accordance with Equation (2).

$$(W_{Coffee} \times T_{Coffee}) + (W_{Commute} \times T_{Commute}) + (W_{Vacation} \times T_{Vacation}) + (W_{Groceries} \times T_{Groceries}) + (W_{Carpool} \times T_{Carpool}) = T_{Score} \quad (2)$$

In Equation (2), $T_{Coffee}$ may represent the coffee run 556 trip objective and $W_{Coffee}$ may represent a corresponding weight. Additionally, $T_{Commute}$ may represent the daily commute 558 trip objective and $W_{Commute}$ may represent a corresponding weight, $T_{Vacation}$ may represent the vacation 560 trip objective and $W_{Vacation}$ may represent a corresponding weight, $T_{Groceries}$ may represent the groceries 562 trip objective and $W_{Groceries}$ may represent a corresponding weight, and $T_{Carpool}$ may represent the kids' carpool 564 trip objective and W may represent a corresponding weight. $T_{Score}$ may represent the final objective score (e.g., a weighted sum). The trip objectives 538 (e.g., $T_{Score}$) may contribute to an overall score in some approaches.

Additionally or alternatively, the trip planner 520 (e.g., algorithm) may perform trip planning in accordance with Equation (3).

$$(W_{Vehicle} \times I_{Vehicle}) + (W_{Environment} \times I_{Environment}) + (W_{Road} \times I_{Road}) + (W_{Destination} \times I_{Destination}) = I_{Score} \quad (3)$$

In Equation (3), $I_{vehicle}$ may represent the vehicle information 566 and $W_{Vehicle}$ may represent a corresponding weight. Additionally, $I_{Environment}$ may represent the environment information 568 and $W_{Environment}$ may represent a corresponding weight, $I_{Road}$ may represent the road information 570 and $W_{Road}$ may represent a corresponding weight, and $I_{Destination}$ may represent the destination information 572 and $W_{Destination}$ may represent a corresponding weight. It should be noted that multiple types of information (e.g., multiple destination information 572 factors) may be included in the equation in some approaches. For example, multiple destination information factors may include checkout wait time, female/male ratio, cleanliness, etc. $I_{score}$ may represent the final intelligence score (e.g., a weighted sum). The intelligence 540 (e.g., $I_{Score}$) may contribute to an overall score in some approaches.

In some approaches, two or more factors (e.g., weighted sums) may be added to produce an overall score. For example, the evaluation score, objective score, and intelligence score may be added as illustrated in Equation (4).

$$E_{Score} + T_{Score} + I_{Score} = \text{Overall}_{Score} \quad (4)$$

Adding the two or more factors may produce the overall score (e.g., Overall$_{Score}$, trip planning score, etc.).

Scoring destinations may involve utilizing weighting (W) values for one or more evaluation bases, one or more trip objectives, and/or one or more intelligence items. The weighting values may be predetermined, manually set, and/or determined through training. The one or more evaluation bases values and/or the one or more trip objective values may be predetermined, manually set, and/or determined through information collection. The one or move evaluation bases values, the one or more trip objective values, and/or the one or more intelligence item values may be normalized to fit one or more ranges. For example, a best fuel efficiency may be set to 40 miles per gallon (mpg) while a worst fuel efficiency may be set to be 10 mpg. The range of 10-40 mpg may be normalized to a range of 0-10 (e.g., $E_{Fuel}$). In another example, the drive time 546 (e.g., $E_{DriveTime}$) may be an arbitrary range or may depend on one or more selected destinations. For example, a best drive time to work may be the time of the fastest route assuming no traffic and a worst drive time to work may be an expected time for heavy traffic and/or a set amount above the fastest route time (e.g., +1 hour). This range of time (e.g., $E_{DriveTime}$) may be normalized to a range of 0-10.

In some configurations, the suggested route(s) 544 may be provided to a refiner 542. The refiner 542 may receive feedback in some approaches. For example, the feedback may indicate whether a suggested route 544 is accepted, followed, not accepted, not followed, etc. The refiner 542 may utilize the feedback corresponding to the suggested route(s) 544 to refine trip planning. For example, the refiner 542 may increase weights for one or more possible destinations and/or routes that a user follows and/or selects. Additionally or alternatively, the refiner 542 may reduce weights for one or more possible destinations and/or routes that a user does not follow and/or does not select. An example of a method for feedback and refinement is given in connection with FIG. 8.

Figure 6:
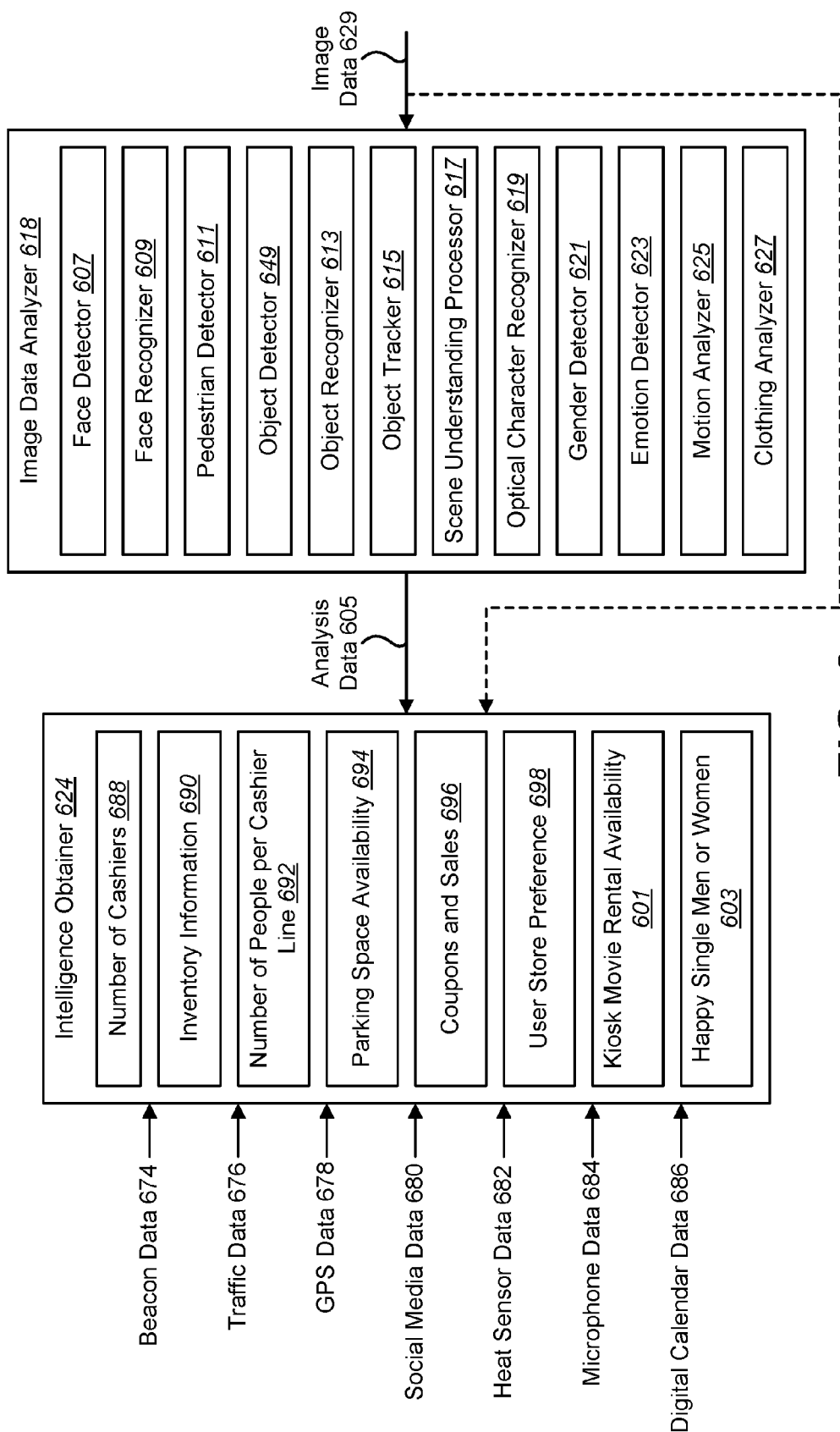
FIG. 6 is a block diagram illustrating an example of intelligence gathering for a grocery store trip.

FIG. 6 is a block diagram illustrating an example of intelligence gathering for a grocery store trip. In particular, FIG. 6 illustrates an example of an intelligence obtainer 624 and an image data analyzer 618. The intelligence obtainer 624 and/or the image data analyzer 618 may be examples of corresponding elements or components described in connection with FIG. 1. The electronic device 102 described in connection with FIG. 1 may operate in accordance with the block diagram of FIG. 6 in some configurations. In this example, several types of information (e.g., real-time dynamic destination information in some cases) may be obtained with data from one or more sources. For example, an intelligence obtainer 624 may obtain (e.g., request and/or receive) beacon data 674, traffic data 676, global positioning system (GPS) data 678, social media data 680, heat sensor data 682, microphone data 684, and/or digital calendar data 686. In some configurations, the intelligence obtainer 624 may additionally or alternatively request and/or receive image data 629. Additionally or alternatively, the image data 629 may be provided to an image data analyzer 618. The image data 629 may originate from one or more on-site image sensors (e.g., cameras).

The image data analyzer 618 may perform one or more kinds of processing (e.g., computer vision analysis, scene analysis, classification analysis, etc.) on the image data 629. For example, the image data analyzer 618 may include a face detector 607, a face recognizer 609, a pedestrian detector 611, an object detector 649, an object recognizer 613, an object tracker 615, a scene understanding processor 617, an optical character recognizer 619, a gender detector 621, an emotion detector 623, a motion analyzer 625, and/or a clothing analyzer 627. For instance, the image data analyzer 618 may perform one or more of face detection, face recognition, pedestrian detection, object detection, object recognition, object tracking, scene understanding, optical character recognition, gender detection, emotion detection, motion analysis, and/or clothing analysis. The image data analyzer 618 may produce analysis data 605 (e.g., computer vision data), which may be provided to the intelligence obtainer 624.

The intelligence obtainer 624 may utilize the analysis data 605 alone or in combination with one or more other kinds of data (e.g., beacon data 674, traffic data 676, global positioning system (GPS) data 678, social media data 680, heat sensor data 682, microphone data 684, and/or digital calendar data 686) to produce one or more kinds of information (e.g., real-time dynamic destination information in some cases). Examples of the one or more kinds of information may include parking space availability 694, number of cashiers 688, number of people per cashier line 692, inventory information 690, coupons and sales 696, user store preference 698, kiosk movie rental availability 601, and/or happy single men or women 603, etc. The information (e.g., real-time dynamic destination information in some cases) may be utilized by the electronic device 102 in trip planning as described herein.

Some examples of computer vision analysis are given as follows. In one example, a camera may be mounted near a checkout line at a grocery store. The camera may supply the image data 629 to the image data analyzer 618 (via a communication interface, for example). The clothing analyzer 627 may analyze the clothing of the people in the checkout area to determine whether any of the clothing is a grocery store uniform. The face detector 607 may detect a number of faces in the checkout area. The intelligence obtainer 624 may utilize the number of faces in the checkout as a total number of people in a checkout area. The intelligence obtainer 624 may utilize the number of uniforms detected as a number of cashiers 688. The number of cashiers 688 may be subtracted from the total number of people (e.g., faces) detected to determine a number of people in line. The number of people in line may be divided by the number of cashiers to determine the number of people per cashier line 692 (on average, for example). In some approaches, the intelligence obtainer 624 may assume an amount of time per person in the checkout line to determine an amount of checkout time. In some approaches, the object detector 649 may detect a number of items in each person's cart in line to estimate an amount of checkout time.

In another example, the gender detector 621 may utilize face shape and/or body shape to determine gender of each of the people. The object detector 649 and/or the object recognizer 613 may determine which people are wearing wedding rings to determine a number of single men and/or a number of single women. The emotion detector 623 may determine which of the people without wedding rings have pleasant facial expressions. The intelligence obtainer may utilize this information to determine the happy single men or women 603. For example, those people detected as women without wedding rings with pleasant facial expressions may be determined as a number of happy single women 603. People detected as men without wedding rings with pleasant facial expressions may be determined as a number of happy single men 603. It should be noted that people detected as children (based on body size and/or facial indicia of age, etc.) may be excluded from the calculation.

Figure 7:
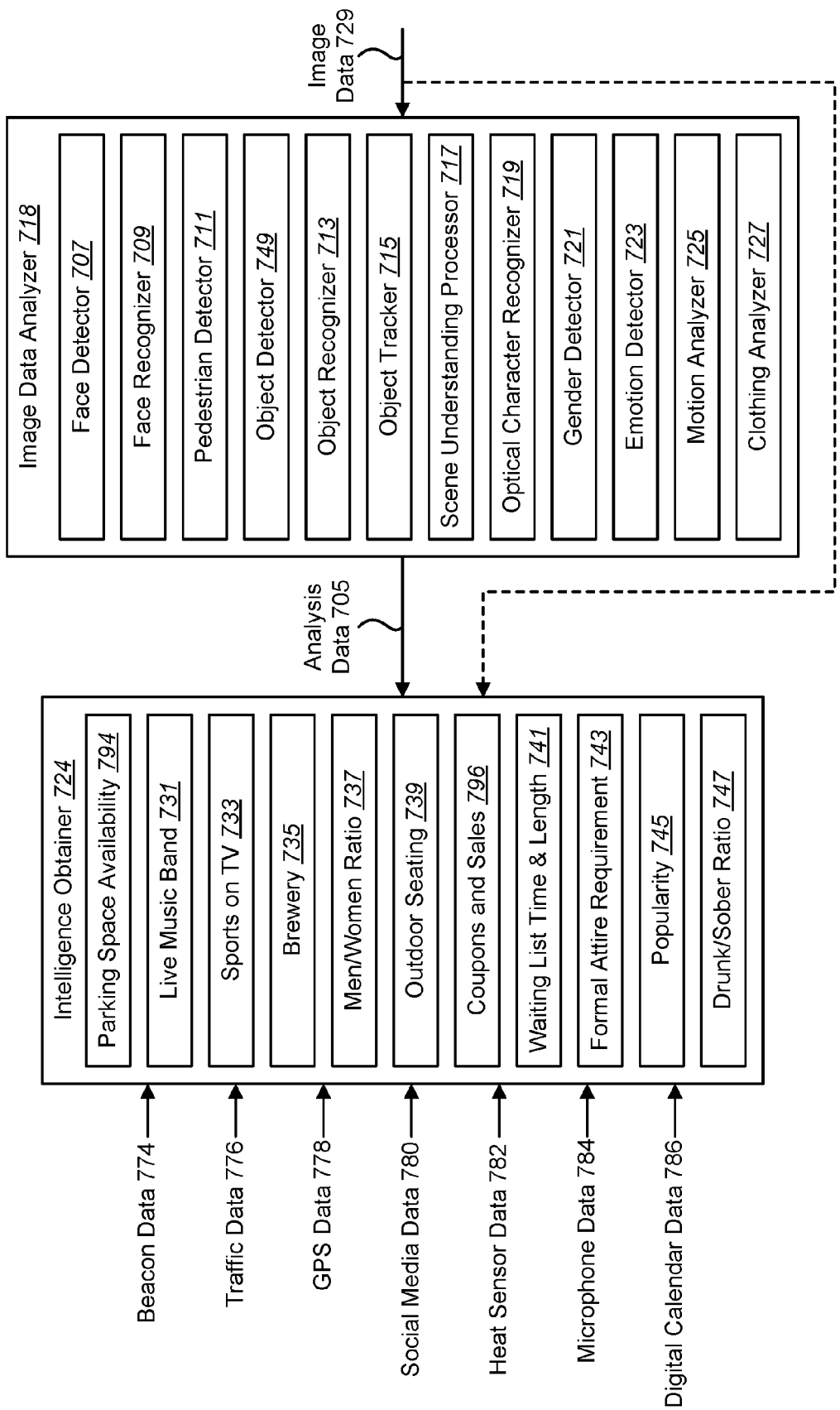
FIG. 7 is a block diagram illustrating an example of intelligence gathering for a bar or restaurant trip.

FIG. 7 is a block diagram illustrating an example of intelligence gathering for a bar or restaurant trip. In particular, FIG. 7 illustrates an example of an intelligence obtainer 724 and an image data analyzer 718 (e.g., computer vision analyzer). The intelligence obtainer 724 and/or the image data analyzer 718 may be examples of corresponding elements or components described in connection with FIG. 1. The electronic device 102 described in connection with FIG. 1 may operate in accordance with the block diagram of FIG. 7 in some configurations. In this example, several types of information (e.g., real-time dynamic destination information in some cases) may be obtained with data from one or more sources. For example, an intelligence obtainer 724 may obtain (e.g., request and/or receive) beacon data 774, traffic data 776, global positioning system (GPS) data 778, social media data 780, heat sensor data 782, microphone data 784, and/or digital calendar data 786. In some configurations, the intelligence obtainer 724 may additionally or alternatively request and/or receive image data 729. Additionally or alternatively, the image data 729 may be provided to an image data analyzer 718. The image data 729 may originate from one or more on-site image sensors (e.g., cameras).

The image data analyzer 718 may perform one or more kinds of processing on the image data 729. For example, the image data analyzer 718 may include a face detector 707, a face recognizer 709, a pedestrian detector 711, an object detector 749, an object recognizer 713, an object tracker 715, a scene understanding processor 717, an optical character recognizer 719, a gender detector 721, an emotion detector 723, a motion analyzer 725, and/or a clothing analyzer 727. For instance, the image data analyzer 718 may perform one or more of face detection, face recognition, pedestrian detection, object detection, object recognition, object tracking, scene understanding, optical character recognition, gender detection, emotion detection, motion analysis, and/or clothing analysis. The image data analyzer 718 may produce analysis data 705 (e.g., computer vision data), which may be provided to the intelligence obtainer 724.

The intelligence obtainer 724 may utilize the analysis data 705 alone or in combination with one or more other kinds of data (e.g., beacon data 774, traffic data 776, global positioning system (GPS) data 778, social media data 780, heat sensor data 782, microphone data 784, and/or digital calendar data 786) to produce one or more kinds of information (e.g., real-time dynamic destination information in some cases). Examples of the one or more kinds of information may include parking space availability 794, live music band 731, sports on television (TV) 733, brewery 735, coupons and sales 796, men to women ratio 737, outdoor seating 739, waiting list time and length 741, formal attire requirement 743, popularity 745, drunk to sober ratio 747, etc. The information (e.g., real-time dynamic destination information in some cases) may be utilized by the electronic device 102 in trip planning as described herein.

Figure 8:
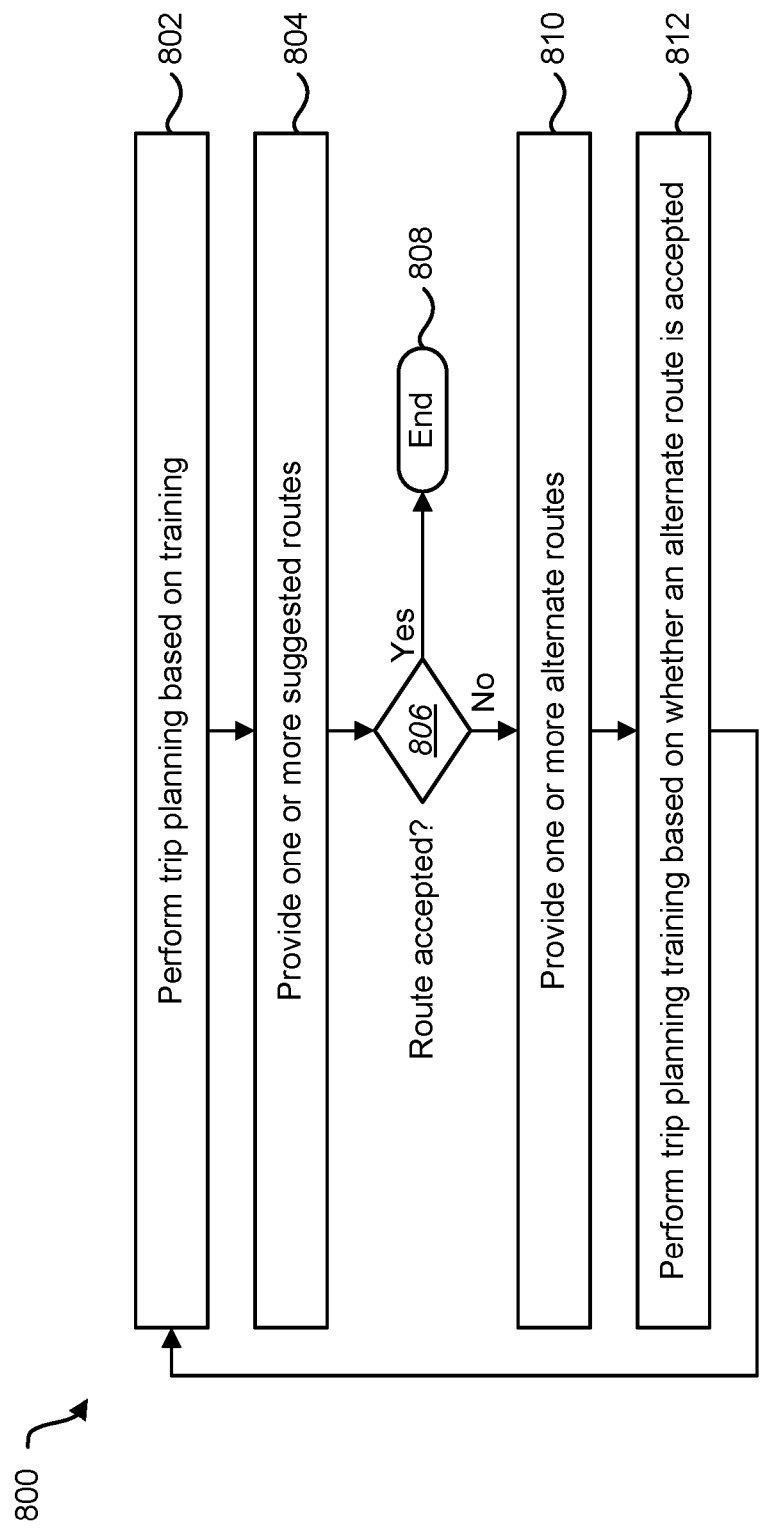
FIG. 8 is a flow diagram illustrating an example of a method for feedback and refinement in accordance with some configurations of the systems and methods disclosed herein.

FIG. 8 is a flow diagram illustrating an example of a method 800 for feedback and refinement in accordance with some configurations of the systems and methods disclosed herein. The method 800 described in connection with FIG. 8 may be performed by the electronic device 102 described in connection with FIG. 1 and/or by the refiner 542 described in connection with FIG. 5 in some configurations. In some cases, trip planning (e.g., a route analysis algorithm) may not have produced a suggestion that a user likes or accepts. Feedback may allow for training of the trip planning (e.g., route analysis algorithm). One or more alternate routes (and corresponding benefits and/or reasons chosen by the algorithm, for example) may be presented to the user. The user may choose the desired route. This may allow the electronic device 102 (e.g., trip planning) to learn true trip objectives/goals, whether the user's tastes change over time, and/or whether there are exceptions to specific routes for learning, etc.

The electronic device 102 may perform 802 trip planning based on training. In cases where prior training has been performed, for example, the prior training may be utilized to perform 802 trip planning (e.g., route analysis) to produce one or more suggested routes (e.g., recommended trips). For example, prior training may indicate weightings of types of information (e.g., real-time dynamic destination information), of one or more particular destinations, and/or of one or more particular routes (e.g., trips).

The electronic device 102 may provide 804 one or more suggested routes. This may be accomplished as described in connection with one or more of FIGS. 1-4. For example, the electronic device 102 may present one or more suggested routes on a display (e.g., user interface) and/or may send the one or more suggested routes to a remote device.

The electronic device 102 may determine 806 whether a route is accepted (e.g., whether a user has accepted the suggested route or trip). This may be accomplished as described in connection with FIG. 1. For example, the electronic device 102 may receive a user input indicating acceptance and/or selection of a particular trip. Additionally or alternatively, the electronic device 102 may track a user travel route to determine whether the user follows the suggested trip and/or whether a self-driving vehicle operates in accordance with the suggested trip. If the user accepts the route (e.g., trip), operation may end 808 in some configurations. In some approaches, the electronic device 102 may utilize the acceptance of the suggested route as feedback to perform 812 trip planning training. For example, the electronic device 102 may increase weight(s) for one or more destinations of the accepted route. Additionally or alternatively, the electronic device 102 may reduce weight(s) for one or more destinations of a non-accepted route. Accordingly, more weight may be added for a destination that is accepted and/or weight may be reduced for a destination that is rejected. This may provide a kind of probability filter that ties in with the user's habits and/or the ability (of the electronic device 102, for example) to predict and/or guess habits.

If the user does not accept the suggest route (e.g., trip), the electronic device 102 may provide 810 one or more alternate routes. This may be accomplished as described in connection with FIG. 1. For example, the electronic device 102 may present one or more alternate routes (e.g., trips) that satisfy the trip objective(s) (e.g., that achieve trip goal(s)). In some configurations, the electronic device 102 may additionally present benefits of the one or more alternate routes (e.g., money cost, time, potential profit, etc.). In some approaches, the electronic device 102 may obtain non-service information for one or more non-service sites and/or perform trip planning based on comparing the non-service information with dynamic destination information (e.g., in-service information for one or more in-service sites).

The electronic device 102 may perform 812 trip planning training based on whether an alternate route is accepted. For example, the electronic device 102 may receive an input (from a user), indicating selection (or rejection, for example) of one of the alternate trips. Additionally or alternatively, the electronic device 102 may detect whether the alternate route is accepted. For example, the electronic device 102 may track whether the user is following a suggested alternate route. Based on whether an alternate route is accepted, the electronic device 102 may perform 812 trip planning training (e.g., route analysis training). For example, the electronic device 102 may perform machine learning to take the accepted route (e.g., accepted alternate route) into account. In a case that no route is accepted, the electronic device 102 may perform machine learning to account for the non-accepted route(s). Accordingly, user-preferred routes (e.g., destinations and/or trips) in association with contextual information (which may include real-time dynamic destination information) may be weighted more heavily for subsequent trip planning.

Figure 9:
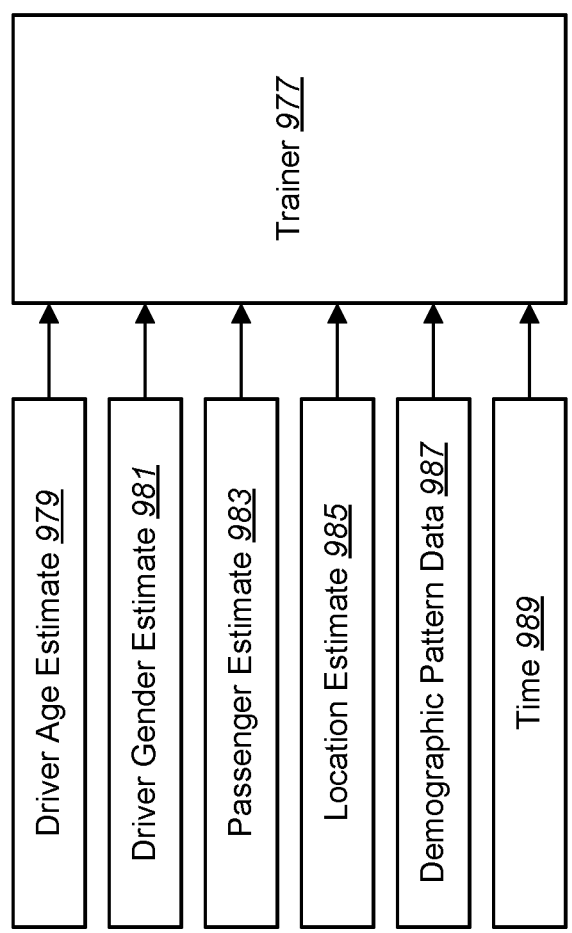
FIG. 9 is a block diagram illustrating one example of a trainer that may be implemented in accordance with some configurations of the systems and methods disclosed herein.

FIG. 9 is a block diagram illustrating one example of a trainer 977 that may be implemented in accordance with some configurations of the systems and methods disclosed herein. In some configurations, the trainer 977 may be implemented in the electronic device 102 described in connection with FIG. 1. For example, the trainer 977 may be implemented in the processor 112 (e.g., in the trip planner 120, in a refiner, in a separate module, etc.).

One potential issue with predicting (e.g., guessing) and learning what a user prefers is that incorrect predictions (e.g., guesses) may occur. While this can be used for training (e.g., training trip planning), enough incorrect guesses may frustrate the user. For example, a user may eventually stop using trip planning. Accordingly, it may be beneficial for the trip planning to be "smart enough" to make high quality predictions and/or estimates. In order to ensure high quality prediction and/or estimation, it may be beneficial to utilize high quality initial training data. This may help to avoid a negative training experience for the user.

In some configurations of the systems and methods disclosed herein, the electronic device 102 may obtain user model data. For example, the electronic device 102 may obtain user model data based on computer vision and/or location (e.g., GPS) data. For instance, the electronic device 102 (e.g., intelligence obtainer 124, trip planner 120, image obtainer 114, and/or image data analyzer 118) may estimate driver gender, estimate driver age, estimate passenger information, estimate driver location (e.g., user's home, neighborhood, city, state, etc.), and/or obtain demographic pattern data (per user type, for example).

Some configurations of the systems and methods disclosed herein may utilize computer vision to analyze one or more destinations and/or one or more users (e.g., driver and/or passenger(s), etc.). For example, the electronic device 102 may perform a user (e.g., age, gender, etc.) modeling analysis with location data (e.g., GPS location) to improve utilization of the (possibly vast) prior training database to make more educated guesses. Time (e.g., time of day) may be utilized as well in some approaches. For example, particular demographic groups may tend to go to movie theaters and clubs on weekends, while others may tend to go to home improvement stores (or electronics shops, clothing stores, malls, etc.). Additionally or alternatively, users from particular areas (e.g., towns, cities, neighborhoods, etc.) may tend to frequent similar destinations. Accordingly, for example, the computer vision analysis may help to model (e.g., characterize) a user (e.g., a soccer mom, a do-it-yourself (DIY) weekend handyman, a professional, a lawyer, a fast food junkie, a high schooler, a carpooler, etc.) in order to improve training. User model data may be utilized to perform intelligent indexing into the prior training database.

Estimating driver gender, driver age, passenger information, and/or demographic pattern data, etc. may be based on image data and/or computer vision in some approaches. For example, the image obtainer 114 may obtain one or more images of one or more users (e.g., driver, passenger(s), etc.). For instance, the image obtainer 114 may obtain one or more images from an interior of the vehicle, including one or more images of the driver and/or one or more images of any passenger(s). The image data analyzer 118 may perform computer vision analysis on the image(s) to produce the user model data. For example, the image data analyzer 118 may estimate driver gender based on face shape and/or body proportions (e.g., body size and/or body shape, etc.), may estimate driver age based on age indicators (e.g., skin wrinkles, hair pattern, hair color, etc.), and/or may similarly estimate passenger information (e.g., number of passengers, passenger gender(s), passenger age(s), etc.). Accordingly, the electronic device 102 may obtain analysis of one or more images of one or more users from a vehicle interior to determine user model data. Additionally or alternatively, the electronic device 102 may obtain (e.g., receive), from a remote device, analysis of one or more images of one or more users from a vehicle interior to determine user model data. Trip planning may be based on user model data.

Demographic pattern data may be estimated based on image analysis (e.g., computer vision). For example, driver gender, driver age, and/or passenger information (that are estimated from computer vision) may indicate a type (e.g., lone middle-age male, teenage female with 3 teenage female passengers, etc.), which may be utilized to estimate (e.g., select) a demographic pattern. For example, the electronic device 102 may access (from local storage and/or from a remote device, for instance) demographic pattern data. Demographic pattern data may indicate common patterns (e.g., preferences, behaviors, habits, etc.) for particular demographics. For instance, users of a type (e.g., of a particular age, gender, and/or from an area (which may be determined based on location data, for example), etc.) may tend to exhibit preferences for certain destinations and/or routes.

Location data may indicate a location (e.g., a home location, a home neighborhood location, a home county, home state, etc.) of a user. The electronic device 102 may obtain the location data with one or more techniques (e.g., GPS data, Wi-Fi assisted location (e.g., triangulation), cellular assisted location (e.g., cellular tower triangulation), and/or inertial navigation, etc.

As illustrated in FIG. 9, for example, the electronic device 102 may obtain a driver age estimate 979, a driver gender estimate 981, a passenger estimate 983, a location estimate 985, demographic pattern data 987, and/or time 989. In some approaches, the electronic device 102 may determine the driver age estimate 979, the driver gender estimate 981, the passenger estimate 983, and/or the demographic pattern data 987 based on image data and/or computer vision analysis as described above. For example, the image data analyzer 118 may utilize one or more images of one or more users (e.g., driver and/or passenger(s)) from a vehicle interior to determine the driver age estimate 979, the driver gender estimate 981, the passenger estimate 983, and/or the demographic pattern data 987. The electronic device 102 may determine the location estimate 985 with one or more techniques (e.g., GPS data, Wi-Fi assisted location (e.g., triangulation), cellular assisted location (e.g., cellular tower triangulation), and/or inertial navigation, etc. The driver age estimate 979, the driver gender estimate 981, the passenger estimate 983, the location estimate 985, and/or the demographic pattern data 987 may be provided to the trainer 977. In some approaches, the electronic device 102 may also obtain time 989 (e.g., time of day, day of week, week of month, month of year, year, etc.), which may be provided to the trainer 977. The time 989 may be obtained from an internal clock and/or from a remote device.

The trainer 977 may perform training based on one or more of the data (e.g., driver age estimate 979, driver gender estimate 981, passenger estimate 983, location estimate 985, the demographic pattern data 987, and/or time 989). For example, the trainer 977 may generate and/or update (e.g., refine) one or more weights for trip planning from one or more of the data. For example, if one or more of the data indicate that the user is more likely to prefer a particular restaurant over another, the trainer 977 may increase one or more weights associated with that restaurant. In some configurations, the trainer 977 may additionally or alternatively adjust weights for one or more evaluation bases, one or more trip objectives, and/or one or more intelligence items (e.g., real-time dynamic destination information).

Figure 10:
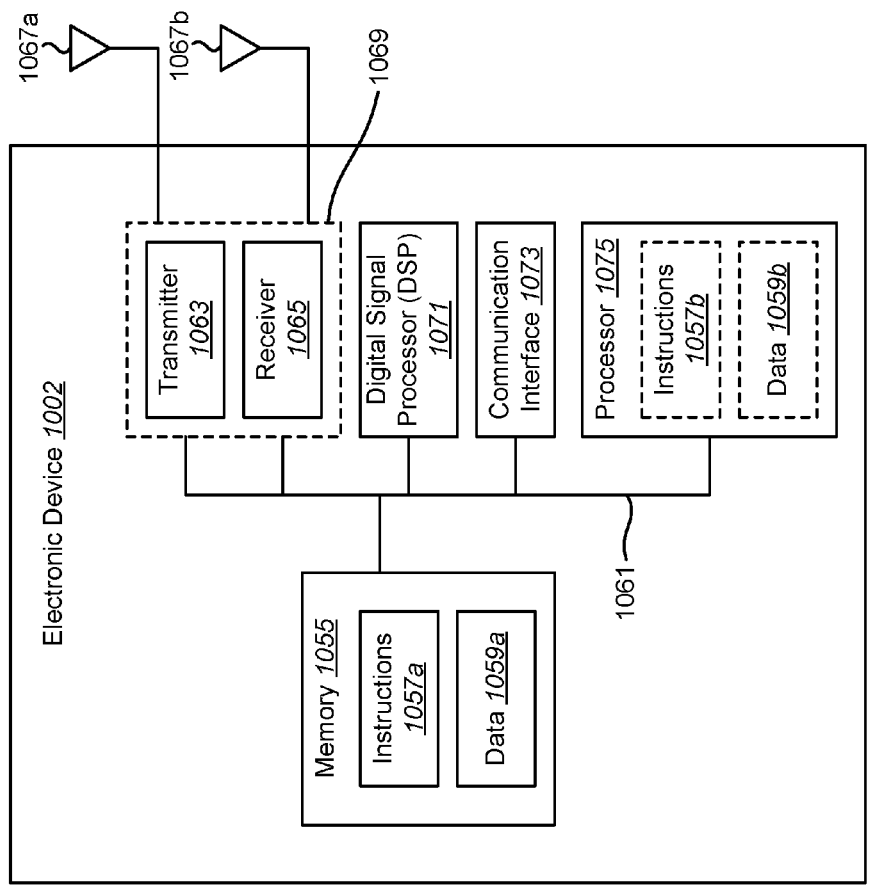
FIG. 10 illustrates certain components that may be included within an electronic device.

FIG. 10 illustrates certain components that may be included within an electronic device 1002. The electronic device 1002 may be an example of and/or may be implemented in accordance with the electronic device 102 described in connection with FIG. 1. The electronic device 1002 may be (or may be included within) a camera, video camcorder, digital camera, cellular phone, smart phone, computer (e.g., desktop computer, laptop computer, etc.), tablet device, media player, television, automobile, personal camera, action camera, wearable device (e.g., smart watch, smart watch camera, wearable camera, head-mounted display, etc.), surveillance camera, mounted camera, connected camera, robot, aircraft, drone, unmanned aerial vehicle (UAV), healthcare equipment, gaming console, personal digital assistants (PDA), set-top box, etc. The electronic device 1002 includes a processor 1075. The processor 1075 may be a general purpose single- or multi-chip microprocessor (e.g., an ARM), a special purpose microprocessor (e.g., a digital signal processor (DSP)), a microcontroller, a programmable gate array, etc. The processor 1075 may be referred to as a central processing unit (CPU). Although just a single processor 1075 is shown in the electronic device 1002, in an alternative configuration, a combination of processors (e.g., an ARM and DSP) could be used.

The electronic device 1002 also includes memory 1055. The memory 1055 may be any electronic component capable of storing electronic information. The memory 1055 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1059a and instructions 1057a may be stored in the memory 1055. The instructions 1057a may be executable by the processor 1075 to implement one or more of the methods 200, 300, 400, 800 described herein. Executing the instructions 1057a may involve the use of the data 1059a that is stored in the memory 1055. When the processor 1075 executes the instructions 1057, various portions of the instructions 1057b may be loaded onto the processor 1075, and various pieces of data 1059b may be loaded onto the processor 1075.

The electronic device 1002 may also include a transmitter 1063 and a receiver 1065 to allow transmission and reception of signals to and from the electronic device 1002. The transmitter 1063 and receiver 1065 may be collectively referred to as a transceiver 1069. One or multiple antennas 1067a-b may be electrically coupled to the transceiver 1069. The electronic device 1002 may also include (not shown) multiple transmitters, multiple receivers, multiple transceivers and/or additional antennas.

The electronic device 1002 may include a digital signal processor (DSP) 1071. The electronic device 1002 may also include a communication interface 1073. The communication interface 1073 may enable one or more kinds of input and/or output. For example, the communication interface 1073 may include one or more ports and/or communication devices for linking other devices to the electronic device 1002. Additionally or alternatively, the communication interface 1073 may include one or more other interfaces (e.g., touchscreen, keypad, keyboard, microphone, camera, etc.). For example, the communication interface 1073 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1061.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, the method comprising:
    obtaining one or more trip objectives;
    identifying an association between at least one site and the one or more trip objectives;
    obtaining image data from the at least one site;
    performing analysis on the image data to determine dynamic destination information corresponding to the at least one site;
    obtaining a selection or weighting for at least one of a plurality of information types, the plurality of information types including the dynamic destination information;
    obtaining one or more evaluation bases;
    performing trip planning based on the dynamic destination information, the one or more trip objectives, the one or more evaluation bases, and the selection or weighting; and
    providing one or more suggested routes based on the trip planning.

2. The method of claim 1, further comprising determining whether one of the one or more suggested routes is accepted, and in a case that none of the one or more suggested routes is accepted, the method further comprises:
    obtaining non-service information for one or more non-service sites;
    performing trip planning based on comparing the non-service information with the dynamic destination information; and
    providing one or more alternate routes based on the comparison.

3. The method of claim 1, further comprising determining whether one of the one or more suggested routes is accepted, and in a case that none of the one or more suggested routes is accepted, the method further comprises:
    providing one or more alternate routes; and
    performing trip planning training based on an alternate route selection.

4. The method of claim 1, wherein the dynamic destination information is updated on an order of minutes or seconds.

5. The method of claim 1, wherein the dynamic destination information comprises at least one of a time aspect of an activity at the at least one site, a population aspect at the at least one site, a product aspect at the at least one site, a service aspect at the at least one site, or a site feature aspect.

6. The method of claim 5, wherein the time aspect includes at least one of parking time, wait time, transaction time, and service time.

7. The method of claim 5, wherein the population aspect includes at least one of a number of people, demographics of people, clothing of people, emotion of people, state of people, and activity of people.

8. The method of claim 5, wherein the product aspect at the at least one site includes at least one of product availability, product accessibility, product deals, or product price.

9. The method of claim 5, wherein the service aspect includes at least one of service availability, service accessibility, service deals, or service price.

10. The method of claim 5, wherein the site feature aspect includes at least one of type of furniture, location of furniture, amount of furniture, furniture occupancy, number of bathrooms, bathroom availability, site cleanliness, or site lighting.

11. The method of claim 1, wherein the plurality of information types include the dynamic destination information and one or more other information types.

12. The method of claim 11, wherein the one or more other information types are based on at least one image taken from a vehicle of an external scene.

13. The method of claim 1, further comprising ranking a set of potential trips based on a degree to which each of the potential trips satisfies the one or more trip objectives in accordance with the one or more evaluation bases.

14. The method of claim 1, further comprising obtaining analysis on one or more images of one or more users from a vehicle interior to determine user model data, and wherein performing the trip planning is further based on the user model data.

15. An electronic device, comprising:
a processor;
a memory in electronic communication with the processor;
instructions stored in the memory, the instructions being executable to:
obtain one or more trip objectives;
identify an association between at least one site and the one or more trip objectives;
obtain image data from the at least one site;
perform analysis on the image data to determine dynamic destination information corresponding to the at least one site;
obtain a selection or weighting for at least one of a plurality of information types, the plurality of information types including the dynamic destination information;
obtaining one or more evaluation bases;
perform trip planning based on the dynamic destination information, the one or more trip objectives, the one or more evaluation bases, and the selection or weighting; and
provide one or more suggested routes based on the trip planning.

16. The electronic device of claim 15, wherein the instructions are executable to determine whether one of the one or more suggested routes is accepted, and in a case that none of the one or more suggested routes is accepted, the instructions are executable to:
obtain non-service information for one or more non-service sites;
perform trip planning based on comparing the non-service information with the dynamic destination information; and
provide one or more alternate routes based on the comparison.

17. The electronic device of claim 15, wherein the instructions are executable to determine whether one of the one or more suggested routes is accepted, and in a case that none of the one or more suggested routes is accepted, the instructions are executable to:
provide one or more alternate routes; and
perform trip planning training based on an alternate route selection.

18. The electronic device of claim 15, wherein the instructions are executable to update the dynamic destination information on an order of minutes or seconds.

19. The electronic device of claim 15, wherein the dynamic destination information comprises at least one of a time aspect of an activity at the at least one site, a population aspect at the at least one site, a product aspect at the at least one site, a service aspect at the at least one site, or a site feature aspect.

20. The electronic device of claim 19, wherein the time aspect includes at least one of parking time, wait time, transaction time, and service time.

21. The electronic device of claim 19, wherein the population aspect includes at least one of a number of people, demographics of people, clothing of people, emotion of people, state of people, and activity of people.

22. The electronic device of claim 19, wherein the product aspect at the at least one site includes at least one of product availability, product accessibility, product deals, or product price.

23. The electronic device of claim 19, wherein the service aspect includes at least one of service availability, service accessibility, service deals, or service price.

24. The electronic device of claim 19, wherein the site feature aspect includes at least one of type of furniture, location of furniture, amount of furniture, furniture occupancy, number of bathrooms, bathroom availability, site cleanliness, or site lighting.

25. The electronic device of claim 15, wherein the plurality of information types include the dynamic destination information and one or more other information types.

26. The electronic device of claim 25, wherein the one or more other information types are based on at least one image taken from a vehicle of an external scene.

27. The electronic device of claim 15, wherein the instructions are executable to rank a set of potential trips based on a degree to which each of the potential trips satisfies the one or more trip objectives in accordance with the one or more evaluation bases.

28. The electronic device of claim 15, wherein the instructions are executable to obtain analysis on one or more images of one or more users from a vehicle interior to determine user model data, and wherein performing the trip planning is further based on the user model data.

29. A non-transitory tangible computer-readable medium storing computer-executable code, comprising:
code for causing an electronic device to obtain one or more trip objectives;
code for causing the electronic device to identify an association between at least one site and the one or more trip objectives;
code for causing the electronic device to obtain image data from the at least one site;
code for causing the electronic device to perform analysis on the image data to determine dynamic destination information corresponding to the at least one site;

code for causing the electronic device to obtain a selection or weighting for at least one of a plurality of information types, the plurality of information types including the dynamic destination information;

code for causing the electronic device to obtain one or more evaluation bases;

code for causing the electronic device to perform trip planning based on the dynamic destination information, the one or more trip objectives, the one or more evaluation bases, and the selection or weighting; and code for causing the electronic device to provide one or more suggested routes based on the trip planning.

30. The computer-readable medium of claim 29, further comprising code for causing the electronic device to determine whether one of the one or more suggested routes is accepted, and in a case that none of the one or more suggested routes is accepted, the computer-readable medium further comprises:

code for causing the electronic device to obtain non-service information for one or more non-service sites;

code for causing the electronic device to perform trip planning based on comparing the non-service information with the dynamic destination information; and code for causing the electronic device to provide one or more alternate routes based on the comparison.

\* \* \* \* \*